(12) United States Patent
Mahmoud et al.

(10) Patent No.: US 10,844,278 B2
(45) Date of Patent: Nov. 24, 2020

(54) COMPOSITION AND METHOD FOR REMOVING OIL-BASED FILTER CAKE

(71) Applicant: KING FAHD UNIVERSITY OF PETROLEUM AND MINERALS, Dhahran (SA)

(72) Inventors: Mohamed Mahmoud, Dhahran (SA); Salah El-Din Elkatatny, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 117 days.

(21) Appl. No.: 15/650,341

(22) Filed: Jul. 14, 2017

(65) Prior Publication Data

US 2019/0016947 A1 Jan. 17, 2019

(51) Int. Cl.
| | | |
|---|---|---|
| *C09K 8/74* | (2006.01) | |
| *C09K 8/52* | (2006.01) | |
| *E21B 37/00* | (2006.01) | |
| *C09K 8/524* | (2006.01) | |
| *C09K 8/03* | (2006.01) | |
| *C09K 8/62* | (2006.01) | |

(52) U.S. Cl.
CPC .................. *C09K 8/74* (2013.01); *C09K 8/52* (2013.01); *C09K 8/524* (2013.01); *E21B 37/00* (2013.01); *C09K 8/03* (2013.01); *C09K 8/62* (2013.01); *C09K 2208/24* (2013.01); *C09K 2208/26* (2013.01)

(58) Field of Classification Search
CPC . C09K 8/03; C09K 8/52; C09K 8/524; C09K 8/74; C09K 2208/32; Y10S 507/929; Y10S 507/93; Y10S 507/931; Y10S 507/939; E21B 37/00
See application file for complete search history.

(56) References Cited

U.S. PATENT DOCUMENTS

| | | | |
|---|---|---|---|
| 4,030,548 A | 6/1977 | Richardson et al. | |
| 5,067,566 A * | 11/1991 | Dawson | C09K 8/685 166/308.5 |
| 6,569,814 B1 | 5/2003 | Brady et al. | |
| 6,886,635 B2 | 5/2005 | Hossaini et al. | |
| 6,978,838 B2 | 12/2005 | Parlar et al. | |
| 7,709,421 B2 | 5/2010 | Jones et al. | |

(Continued)

OTHER PUBLICATIONS

Ba Geri, B.S., et al., "Single Stage Filter Cake Removal of Barite Weighted Water Based Drilling Fluid", Journal of Petroleum Science and Engineering, vol. 149, pp. 476-484, (Jan. 2017).

(Continued)

*Primary Examiner* — Aiqun Li
(74) *Attorney, Agent, or Firm* — Oblon, McClelland, Maier & Neustadt, L.L.P.

(57) ABSTRACT

The present invention relates to a composition for dissolving an oil-based filter cake in a wellbore, and a single-step method of use. The composition comprises a chelating agent, a converting agent, a polymer removal agent, a mutual solvent, and a surfactant. The present invention also relates to a multi-step method of dissolving an oil-based filter cake using similar components. Both single-step and multistep methods may be used to dissolve oil-based filter cakes comprising barite as a weighting material.

9 Claims, 13 Drawing Sheets

(56) References Cited

U.S. PATENT DOCUMENTS

| 2007/0244015 A1* | 10/2007 | Crews | C09K 8/68 |
| | | | 507/266 |
| 2010/0317559 A1* | 12/2010 | Ryther | C11D 3/044 |
| | | | 510/218 |
| 2016/0362596 A1 | 12/2016 | Socci et al. | |

OTHER PUBLICATIONS

Gunarto, R., et al., "Production Improvement for Horizontal Wells in Sumatra", URL: https://www.onepetro.org/journal-paper/SPE-86545-PA, SPE Production & Facilities, vol. 20, Issue 4, Pages total, (Nov. 2005) (Abstract only).

Examination Report dated Nov. 7, 2019, in GCC Patent Application No. 2018-35139, filed Apr. 15, 2018.

\* cited by examiner

COMPOSITION AND METHOD FOR REMOVING OIL-BASED FILTER CAKE

BACKGROUND OF THE INVENTION

Technical Field

The present invention relates to a composition and methods for removing an oil-based filter cake from a wellbore, including an oil-based barite-weighted filter cake.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

When a well is drilled, a drilling fluid is circulated into the hole to contact the region of the drill bit for a number of reasons, such as cooling the drill bit, carrying the rock cuttings away from the point of drilling, and maintaining a hydrostatic pressure on the formation wall to prevent production during drilling. To prevent production during drilling, the drilling fluid may require a balanced density to counter or suppress formation pressure and keep the wellbore stable. Unbalanced formation pressure may lead to an unexpected influx (also known as a kick) of formation fluids in the wellbore, leading to a blowout from pressured formation fluids.

Drilling fluids may also be called drill-in fluids, completion fluids, drilling mud, or mud. Drilling fluids are typically classified according to their base fluid. In water-based muds, solid particles are suspended in water or brine. Oil can be emulsified in the water. Nonetheless, the water is the continuous phase. Brine-based drilling fluids are a water-based mud (WBM) where the aqueous component is brine. Oil-based muds (OBM) can be either all-oil based or water-in-oil macroemulsions, which are also called invert emulsions. In oil-based mud, the oil may include, but is not limited to, diesel, mineral oil, esters, or alpha-olefins, natural oils, derivatives thereof, and combinations thereof. Oil-based muds containing synthetic oil may be abbreviated as SBM (synthetic oil-based muds).

Drilling fluid is expensive particularly in light of the enormous quantities that must be used during drilling. Drilling fluid can be lost by leaking off into the formation, not only increasing the drilling costs, but also increasing the possibility of damaging the formation, since components of the drilling fluid may deposit in the pores of the formation, plug the flow channels, and reduce the permeability of the rock. To limit drilling fluid losses, preserve the integrity of the drilling fluid, prevent formation damage, and provide a balanced density, the drilling fluid is often intentionally modified with a weighting material that may form a coating, or "filter cake," on the walls of the wellbore. The filter cake should be a thin, low permeability layer that is quickly formed during drilling. The weighting material may be barite, iron oxide, or calcium carbonate, though typically barite is used for its desirable density, low production costs, and ease of handling.

To form a filter cake, the drilling fluid must contain some particles of a size slightly smaller than the pore openings of the formation. These particles are known as bridging particles and are trapped in surface pores, thereby forming a bridge over the formation pores and a thin layer of filter cake on the formation wall. These particles may comprise the weighting material and other polymers added to the drilling fluid, such as xanthan gum and starch. These polymers may not only be used to encapsulate the bridging particles but to improve other properties of the drilling fluid, such as viscosity and emulsification.

After drilling operations, the filter cake should be effectively removed to maximize the well productivity, or otherwise provide a surface for a cement layer. To increase the production of a wellbore, the filter cake should be removed as completely as possible. This is typically done by contacting the filter cake with different compositions to break apart or dissolve the filter cake. Despite its advantages as a weighting material, the removal of barite-containing filter cakes has remained a challenge. Conventional filter cake removal treatments utilizing an oxidizer (e.g. persulfate), hydrochloric acid solution, organic (acetic, formic) acid, or a combination of acid and oxidizer, although effective in removing calcium carbonate containing filer cakes, are ineffective in dissolving barite containing filter cakes. Barite, or barium sulfate, is insoluble in water or acid. Filter cakes from oil-based drilling fluids further complicate effective treatment methods.

Further to this, horizontal wells present unique challenges for both preventing formation damage and effectively removing filter cake. Formation damage may be more significant in horizontal wells than deviated or vertical wells as horizontal wells are exposed to the drilling fluid for longer periods of time. See Thomas, B. et al. (1998, Feb. 18-19). *Distribution of Mud Induced Damage Around Horizontal Wellbores*. Paper SPE-39468-MS presented at the SPE International Symposium on Formation, Lafayette, La. doi: 10.2118/39468-MS; and Frick, T. P. et al., (1993). "Horizontal Well Damage Characterization and Removal." *SPE Prod. & Fac.* 8 (1): 15-22. doi: 10.2118/21795-PA—each incorporated herein by reference in its entirety.

Some specific techniques have been used for filter cake removal from horizontal wells. Removal of the filter cake and formation damage in a horizontal carbonate reservoir using HCl acid is very difficult and expensive because of the large volume of acid consumed due to fast reaction rates, the heterogeneity of the horizontal section, and the difficulty of placing the acid in the appropriate wellbore location. See Bazin, B. et al. (2000). *Carbonate Acidizing: A Physical Simulation of Well Treatments*. Paper 2042 in International Symposium Proceedings, Society of Core Analysts, CD-ROM; Price-Smith, C. et al. (1998, Oct. 20-22). *Open Hole Horizontal Well Cleanup in Sand Control Completions: State of the Art in Field Practice and Laboratory Development*. Paper SPE 50673 presented at the European Petroleum Conference, The Hague, The Netherlands; and Parlar, M. et al. (1998, Oct. 20-22). *Laboratory Development of a Novel, Simultaneous Cake-Cleanup and Gravel-Packing System for Long, Highly-Deviated or Horizontal Open-Hole Completions*. Paper SPE 50651 presented at the European Petroleum Conference, The Hague, The Netherlands—each incorporated herein by reference in its entirety.

TjonJoe-Pin et al. stated that polymer damage, especially in horizontal wells, cannot be effectively removed using oxidizers such as LiOCl, NaOCl, and $Na_2S_2O_8$. See Tjon-Joe-Pin, R. et al. (1993, Mar. 2-5). *Remedial Treatment for Polymeric Damage Removal Provides Improved Well Productivity*. Paper SPE 25214 presented at the SPE International Symposium on Oilfield Chemistry, New Orleans, La.—incorporated herein by reference in its entirety. The active sites on polymer strands can be attacked by acids and oxidizers, but the polymer backbone does not completely react with acids, instead creating partially-degraded polymer strands. See Brannon, H. D. (1994, Sep. 25-28). *Biotechnological Breakthrough Improves Performance of Moderate to High-Temperature Fracturing Applications*. Paper SPE 28513 presented at the Annual Technical Conference and Exhibition, New Orleans, La.—incorporated herein by reference in its entirety. Hembling et al. stated that while enzymes were effective in removing the polymer material, they were not able to completely remove the filter cake. See Hembling, D. et al. (2000, Feb. 23-24). *Using Enzymatic Breakers in Horizontal Wells to Enhance Wellbore Clean-Up*. Paper SPE 58732 *presented at the International Symposium on Formation Damage Control*, Lafayette, La.—incorporated herein by reference in its entirety. McMillan and Davidson stated that enzymes are effective in removing polymers and starch, but enzymes can cause damage at high temperatures because of coagulation. See McMillan, D. N. et al. (2008, Apr. 23). *Recent Advances in the Use of Neutral Organic Acid Precursors in the Breakdown of Water-based and Oil-based Filter Cakes; Productivity and Infectivity Improvements in Limestone and Sandstone Reservoirs*. Presented at the 15th Bergen SPE Conference, Grieghallen, Bergen, Norway—incorporated herein by reference in its entirety. In addition, enzymes have low activities in carbonate formations.

Mahadi et al. used a new acid precursor, which is an ester of an organic acid to remove the drilled-in fluid (DIF) filter cake. See Mahadi, K. A. et al. (2014, Dec. 10-12). *Use of Acid Precursor as Alternative to Acid Treatment to Drill-In Fluid Filter Cake Removal: FN Case Study*. Paper IPTC 17713 presented at the International Petroleum Technology Conference, Kuala Lumpur, Malaysia—incorporated herein by reference in its entirety. They concluded that the field applications proved the effectiveness of acid precursor treatment in removing the filter cake and other formation damage.

Oil-based mud is the common drilling fluid that is used to drill the reservoir section. See Vickers, S. et al. (2011, Jun. 7-10). *Protect and Inject: Optimized Well Fluids Successfully Drill Depleted Reservoirs to Store Gas*. Paper SPE 144798 presented at the SPE European Formation Damage Conference, Noordwijk, The Netherlands—incorporated herein by reference in its entirety. Formation damage is a common issue in the drilling operation due to a poor design of the drill-in fluid, variations in reservoir quality (such as porosity and permeability), lithology, pore size distribution, permeability, and the depletion of formation pressure. See Brege, J. et al. (2012, Feb. 20-22). *Using Microemulsion Technology to Remove Oil-based Mud in Wellbore Displacement and Remediation Applications*. Paper SPE 150237 presented at the North Africa Technology Conference and Exhibition, Cairo, Egypt—incorporated herein by reference in its entirety.

Quintero et al. stated that microemulsions can be used to remove the filter cake of synthetic and oil-based filter cakes in open hole completions. See Quintero, L. et al. (2011, Jun. 7-10). *Phase Boundaries of Microemulsion Systems Help to Increase Productivity*. Paper SPE 144209 presented at the SPE European Formation Damage Conference held in Noordwijk, The Netherlands—incorporated herein by reference in its entirety.

Brege et al. assessed the use of microemulsion technology for removing near wellbore damage (oil-based drilling fluid and oil-based filter cake). See Brege, J. et al. (2012, Feb. 20-22). *Using Microemulsion Technology to Remove Oil-based Mud in Wellbore Displacement and Remediation Applications*. Paper SPE 150237 presented at the North Africa Technology Conference and Exhibition, Cairo, Egypt—incorporated herein by reference in its entirety. They stated that the main advantages of microemulsion fluids are their high oil solubilization, their high diffusion coefficients through porous media, and their reduction of interfacial tension between organic and aqueous phases to near zero values. These advantages make microemulsion fluids excellent candidates for removing formation damage.

Kumar et al. used a single-phase microemulsion fluid where oil and water are co-solubilized by the surfactant(s) and co-surfactants. The water/oil interface has very low interfacial tension which will cause rapid solubilization of oil upon contact. Kumar et al. also concluded that microemulsion fluids were successfully developed to effectively remove synthetic and oil-based filter cake and near-wellbore damage. See Kumar V. A. et al. (2016, 24-26 Feb.). *Overcoming OBM Filter Cake Damage Using Micro-Emulsion Remediation Technology across a High-Temperature Formation*. Paper SPE 178942 presented at the SPE International Conference & Exhibition on Formation Damage Control, Lafayette, La.—incorporated herein by reference in its entirety.

There are many factors affecting the behavior of the micro-emulsion phase such as oil type, co-surfactant, surfactant, salinity, and temperature. In addition to that, the fact that no wells are identical requires a special design for each well and a confirmation of the performance of the micro-emulsion fluid in a laboratory before use. See Brege, J. et al. (2012, Feb. 20-22). *Using Microemulsion Technology to Remove Oil-based Mud in Wellbore Displacement and Remediation Applications*. Paper SPE 150237 presented at the North Africa Technology Conference and Exhibition, Cairo, Egypt—incorporated herein by reference in its entirety. Therefore, an urgent need exists in the petroleum industry for a reliable composition to degrade oil-based barite filter cakes efficiently and completely.

In view of the foregoing, one objective of the present invention is to provide a composition for the removal of an oil-based filter cake, a single-step method for removing an oil-based filter cake from a wellbore, and a multistep method.

BRIEF SUMMARY OF THE INVENTION

According to a first aspect, the present disclosure relates to a composition comprising:
15-30 wt % of a chelating agent;
2-10 wt % of a converting agent;
3-12 wt % of a polymer removal agent configured to remove a polymer coat present on an oil-based filter cake;
3-15 wt % of a mutual solvent; and
0.05-7.00 wt % of a surfactant, each with respect to a total weight of the composition.

In one embodiment, the chelating agent is a salt of at least one selected from the group consisting of DTPA, HEDTA, EDTA, GLDA, HEIDA, MGDA, EDDS, EGTA, NTA, CDTA, AMTP, HEDP, and citrate.

In one embodiment, the converting agent is at least one selected from the group consisting of ammonium carbonate, ammonium chloride, potassium carbonate, potassium chloride, potassium formate, potassium hydroxide, potassium nitrate, potassium cyanide, cesium carbonate, cesium chloride, cesium formate, lithium carbonate, lithium formate, calcium chloride, magnesium chloride, and sodium carbonate.

In one embodiment, the polymer removal agent is at least one selected from the group consisting of a persulfate salt, a perborate salt, a peroxide salt, and an enzyme.

In one embodiment, the polymer removal agent is an enzyme, and the enzyme is at least one selected from the group consisting of an amylase, an endoglucanase, a glucanase, a mannanase, a cellulase, and a xanthanase.

In one embodiment, the mutual solvent is at least one selected from the group consisting of propylene glycol, ethylene glycol, diethylene glycol, glycerol, and 2-butoxyethanol.

In one embodiment, the surfactant is a water-wetting surfactant.

In one embodiment, the composition has a pH of 10-14.

In one embodiment, the composition further comprises 0.05-2.00 wt % of an emulsifier or a second surfactant with respect to the total weight of the oil-based filter cake removal composition.

In one embodiment, the composition has a corrosion rate of 0.00001-0.01 lb/ft$^2$ per 6 h in contact with a steel surface at 325-375° F.

In one embodiment, the composition has an interfacial surface tension of 15-30 dynes/cm with air.

According to a second aspect, the present disclosure relates to a single-step method of dissolving an oil-based filter cake in a wellbore. This method involves contacting the oil-based filter cake in the wellbore with the composition of the first aspect for 18-30 h, wherein at least 80 wt % of the oil-based filter cake dissolves with respect to a total weight of the filter cake prior to the contacting.

In one embodiment of the method, the oil-based filter cake comprises 30-90 wt % barium sulfate with respect to a total weight of the filter cake prior to the contacting.

In one embodiment of the method, a ratio of a total volume of the composition to the total weight of the filter cake prior to the contacting is 20-30 mL/g.

In one embodiment of the method, a temperature in the wellbore is 225-380° F.

In one embodiment of the method, a pressure difference in the wellbore is 180-450 psi.

In one embodiment of the method, the contacting forms an emulsion.

According to a third aspect, the present disclosure relates to a multistep method of dissolving an oil-based barite filter cake in a wellbore. This involves contacting the oil-based barite filter cake with a mixture comprising a mutual solvent and a surfactant to produce a cleaned barite filter cake, and contacting the cleaned barite filter cake with a solution comprising a polymer removal agent, a converting agent, and a chelating agent to produce dissolved and/or chelated barium.

In one embodiment of the multistep method, the oil-based barite filter cake comprises 30-90 wt % barium sulfate with respect to a total weight of the filter cake prior to the contacting.

In one embodiment of the multistep method, the converting agent is at least one selected from the group consisting of ammonium carbonate, ammonium chloride, potassium carbonate, potassium chloride, potassium formate, potassium hydroxide, potassium nitrate, potassium cyanide, cesium carbonate, cesium chloride, cesium formate, lithium carbonate, lithium formate, calcium chloride, magnesium chloride, and sodium carbonate.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
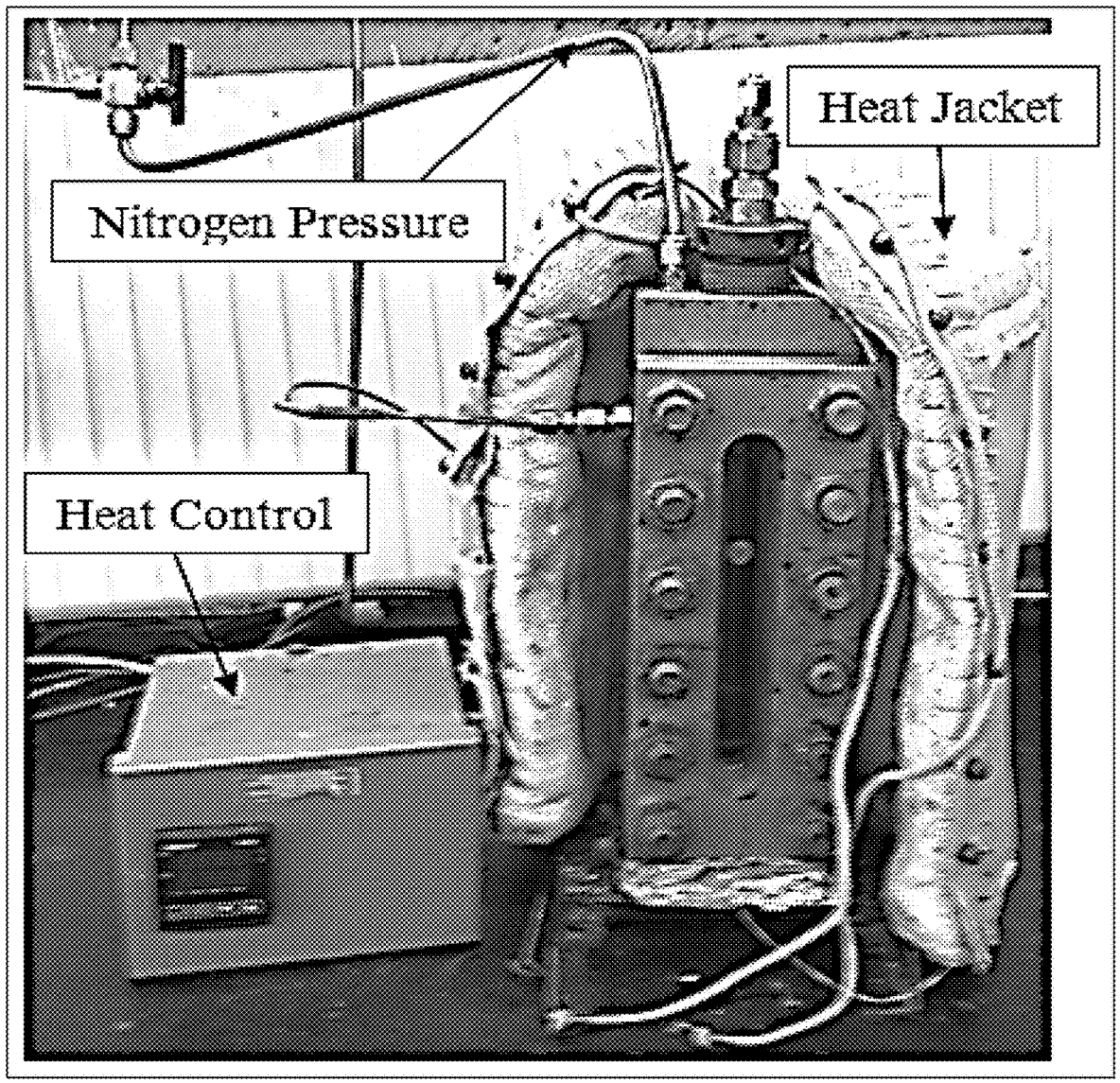
FIG. 1 is a see-through cell used for the fluid compatibility test at high pressure and high temperature.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out. Values of pressure in this disclosure relate to gauge pressure unless otherwise noted.

According to a first aspect, the present disclosure relates to a composition comprising 15-30 wt %, preferably 16-25 wt %, more preferably 17-22 wt % of a chelating agent, 2-10 wt %, preferably 2.5-8 wt %, more preferably 3-7 wt % of a converting agent;

3-12 wt %, preferably 4-11 wt %, more preferably 5-10 wt % of a polymer removal agent configured to remove a polymer coat present on an oil-based filter cake;

3-15 wt %, preferably 4-12 wt %, more preferably 5-10 wt % of a mutual solvent; and 0.05-7.00 wt %, preferably 0.1-6.00 wt %, more preferably 0.5-5.00 wt % of a surfactant, each with respect to a total weight of the composition.

The composition may be called a "breaker fluid" or a "well completion fluid." As used herein, the "formulation" may refer to the composition. A component of the composition may refer to the chelating agent, the converting agent, the polymer removal agent, the mutual solvent, the surfactant, or some other solvent or additive.

In one embodiment, the chelating agent is a salt of at least one selected from the group consisting of DTPA (diethylenetriaminepentaacetic acid), HEDTA (N-(hydroxyethyl)-ethylenediaminetetraacetic acid), EDTA (ethylenediaminetetraacetic acid), GLDA (glutamic acid-N, N diacetic acid), HEIDA (hydroxyethyliminodiacetic acid), MGDA (methylglycinetetraacetic acid), EDDS (ethylenediamine-N, N'-disuccinic acid, EGTA (ethylene glycol-bis(β-aminoethyl ether)-N,N,N',N'-tetraacetic acid), NTA (nitrilotriacetic acid), CDTA (cyclohexanediaminetetraacetic acid), AMTP (aminotri(methylene phosphonic acid), HEDP (1-hydroxyethylidene-1, 1-diphosphonic acid), and citrate. The chelating agent may be considered a conjugate base of DTPA, HEDTA, EDTA, GLDA, HEIDA, MGDA, EDDS, EGTA, NTA, CDTA, AMTP, HEDP, or citric acid. The chelating agent may be present in the composition at a wt % as described previously, or at a molar concentration of 0.45-0.75 M, preferably 0.50-0.70 M, or about 0.6 M. The cation of the salt may be sodium, potassium, lithium, or ammonium, or mixtures thereof. In an alternative embodiment, other chelating agents may be used, such as a salt of polyaspartic acid, a salt of BAPTA (1,2-bis(o-aminophenoxy)ethane-N,N,N',N'-tetraacetic acid), or a salt of some other aminopolycarboxylic acid.

In a preferred embodiment, the chelating agent is $Na_4$-EDTA, $K_4$-EDTA, $Na_5$-DTPA, $K_5$-DTPA, $Na_3$—HEDTA, and/or $K_3$—HEDTA. Even more preferably, the chelating agent is $K_4$-EDTA or $K_5$-DTPA. In an alternative embodiment, the conjugate acid of the salt may be used, such as citric acid or EDTA, and then converted into a conjugate base by the addition of a base such as KOH.

In one embodiment, the converting agent is ammonium carbonate, ammonium chloride, potassium carbonate, potassium chloride, potassium formate, potassium hydroxide, potassium nitrate, potassium cyanide, cesium carbonate, cesium chloride, cesium formate, lithium carbonate, lithium formate, calcium chloride, magnesium chloride, or sodium carbonate. Preferably the converting agent is potassium carbonate, potassium chloride, potassium formate, potassium hydroxide, cesium chloride, cesium carbonate, cesium formate, lithium carbonate, or lithium formate; even more preferably the converting agent is potassium carbonate, potassium formate, cesium chloride, cesium carbonate, or cesium formate. In one preferred embodiment, the converting agent is potassium carbonate. In an alternative embodiment, the converting agent is a potassium salt, a cesium salt, or a lithium salt not listed above.

Barite has a low solubility in water of about 2.5-2.9 mg/L at 20-30° C. As defined here, "barite" refers to the compound $BaSO_4$ (barium sulfate), and may also be spelled as baryte. In one embodiment, the converting agent is able to convert barite into a barium product having a higher solubility by an ion exchange reaction in an aqueous solution. Preferably the barium product has a solubility in water that is increased by a factor of at least 5, preferably by a factor of at least 10, more preferably by a factor of at least 14, even more preferably by a factor of at least 1,000 compared to the solubility of barite in water at the same temperature. For example, cesium chloride may be used as the converting agent, whereby the following ion exchange reaction occurs between barium sulfate and cesium chloride in an aqueous solution:

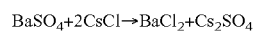

$$BaSO_4 + 2CsCl \rightarrow BaCl_2 + Cs_2SO_4$$

The salt $BaCl_2$ has a higher solubility of about 360 g/L in water at 19-21° C., which may be sufficient to completely dissolve the $BaSO_4$. In other embodiments, a converting agent may be used to produce a barium compound having a lower solubility than $BaCl_2$. For example, a carbonate salt (such as sodium carbonate) may be used to produce barium carbonate. Barium carbonate ($BaCO_3$) has a solubility of about 24 mg/L in water at 19-21° C. While this solubility is much lower than $BaCl_2$, a chelating agent may chelate the soluble $Ba^{2+}$, leading to further dissolution of the $BaCO_3$ and $BaSO_4$ solids.

In alternative embodiments, a converting agent may be used that is not one of the above listed compounds, but is a compound able to convert barite into a barium product having a similar increase in solubility as mentioned above. In other embodiments, the converting agent may be able to convert other compounds by an ion exchange reaction, and these compounds may be calcium carbonate, calcium sulfate, iron sulfide, or strontium sulfate. In a further embodiment, a chelating agent may similarly be used to increase dissolution.

In one embodiment, the polymer removal agent is at least one selected from the group consisting of a persulfate salt, a perborate salt, a peroxide salt, and an enzyme. A persulfate salt may be sodium persulfate, potassium persulfate, ammonium persulfate, or peroxydisulfate. A perborate salt may be sodium perborate or potassium perborate. A peroxide salt may be sodium peroxide, potassium peroxide, or lithium peroxide. In other embodiments, other oxidants may be used such as a percarbonate salt, a perphosphate salt, a persilicate salt, or a hypochlorite salt. In a preferred embodiment, the polymer removal agent is sodium persulfate.

In one embodiment, the polymer removal agent is an enzyme, and the enzyme is at least one selected from the group consisting of an amylase, an endoglucanase, a glucanase, a mannanase, a cellulase, and a xanthanase. The enzyme may be an oxidoreductase, a transferase, a hydrolase, a lyase, an esterase, an isomerase, or a ligase. Preferably the enzyme is temperature stable at wellbore temperatures and in the presence of the surfactant. Preferably the enzyme is not a metalloenzyme, or at least not a metalloenzyme that would be disabled by the chelating agent. Examples of temperature stable enzymes include, but are not limited to, α-amylase, α-glucosidase (for example, from *Pyrococcus furiosus* or *Thermococcus hydrothermalis*), pullulanase (for example, from *Thermococcus hydrothermalis*), endocellulase A and B (for example, from *Thermotoga neapolitana*), α-galactosidase (for example, from *Thermotoga neapolitana*), xylanase (for example, from *Thermotoga maritima*), β-1,4-endoglucanase (for example, from *Pyrococcus horikoshii*), endo-β-glucanase (for example, from *Sulfolobus solfataricus*), Endoglucanase B (EGLB) (for example, from *Aspergillus niger*), celA cellulase from *Thermotoga maritima*, hemicellulase, mannanohydrolase, EBI-244 cellulase, a cellulase from *Desulfurococcus fermentans*, or a xanthanase from NRRL B-18445 culture. In one embodiment, the enzyme is a recombinant enzyme. In another embodiment, an enzyme may be genetically modified in order to provide stability and/or activity at high temperatures. In another embodiment, the enzyme may be a proprietary enzyme from a commercial formulation.

Preferably the polymer removal agent degrades a polymer present in the oil-based filter cake. The polymer may be introduced by the drilling fluid, and may be an oil soluble organic polymer, an oil dispersible organic polymer, an oil soluble bio-polymer, or an oil dispersible bio-polymer. The polymer may be polyacrylamide, partially hydrolyzed polyacrylamide, polyurethane, polybutylene and other polyalpha-olefins, polyvinyl chloride, xanthan, starch, pectin, gelatin, esters (such as esters of carboxylic acid, phosphonic acid, or sulfonic acid), guar gum, or locust bean gum.

In one embodiment, the mutual solvent is at least one selected from the group consisting of propylene glycol, ethylene glycol, diethylene glycol, glycerol, and 2-butoxyethanol. In a preferred embodiment, the mutual solvent is 2-butoxyethanol, which is also known as ethylene glycol butyl ether (EGBE) or ethylene glycol monobutyl ether (EGMBE). In alternative embodiments, the mutual solvent may be one of lower alcohols such as methanol, ethanol, 1-propanol, 2-propanol, n-butanol, n-hexanol, 2-ethylhexanol, and the like, other glycols such as dipropylene glycol, polyethylene glycol, polypropylene glycol, polyethylene glycol-polyethylene glycol block copolymers, and the like, and glycol ethers such as 2-methoxyethanol, diethylene glycol monomethyl ether, and the like, substantially water/oil-soluble esters, such as one or more $C_2$-esters through $C_{10}$-esters, and substantially water/oil-soluble ketones, such as one or more $C_2$-$C_{10}$ ketones.

As defined herein, a "mutual solvent" is a liquid that is substantially soluble in both aqueous and oleaginous fluids, and may also be soluble in other well treatment fluids. As defined here, "substantially soluble" means soluble by more than 10 grams mutual solvent per liter fluid, preferably more than 100 grams per liter. Mutual solvents are routinely used in a range of applications, controlling the wettability of contact surfaces before, during, and/or after a treatment, and preventing or breaking emulsions. Mutual solvents are used because insoluble particles from the formation adsorb organic films from the crude oil. These particles become partially oil-wet and partially water-wet. This causes them to collect material at any oil-water interface, which can stabilize various oil-water emulsions. Mutual solvents remove the organic films, leaving the particles water-wet, thus particle plugging in the formation is decreased. In some embodiments, a mutual solvent may be called a co-solvent.

The selection of a mutual solvent may depend on factors such as the composition of the drilling fluid or the filter cake. In one embodiment, a mixture of more than one mutual solvent may be used in the composition to enhance solubilization, for instance, 2-butoxyethanol may be used with glycerol at a 2-butoxyethanol to glycerol mass ratio of 1:10-10:1, preferably 1:5-5:1, more preferably 1:2-2:1.

As defined here, a surfactant is a compound that lowers the surface tension (or interfacial tension) between two liquids, between a liquid and a gas, or between a liquid and a solid. The surfactant may be a nonionic surfactant, an anionic surfactant, a cationic surfactant, a gemini surfactant, a viscoelastic surfactant, or a zwitterionic surfactant. The surfactant may serve a role as a water-wetting agent, a defoamer, a foamer, a detergent, a dispersant, or an emulsifier. In other embodiments, the surfactant may act as a corrosion inhibitor or a lubricant.

A surfactant molecule comprises a hydrophilic head unit attached to one or more hydrophobic tails. The tail of most surfactants comprises a hydrocarbon chain, which can be branched, linear, or aromatic. Fluorosurfactants have fluorocarbon chains. Siloxane surfactants have siloxane chains. Gemini surfactant molecules comprise two hydrophilic heads and two hydrophobic tails.

Many surfactants include a polyether chain terminating in a highly polar anionic group. The polyether groups often comprise ethoxylated (polyethylene oxide-like) sequences inserted to increase the hydrophilic character of a surfactant. Alternatively, polypropylene oxides may be inserted to increase the lipophilic character of a surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl)dimethylammonio]-1-propanesulfonate), cocamidopropyl hydroxysultaine, ocamidopropyl betaine, phospholipids, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycol alkyl ethers having the formula $CH_3$—$(CH_2)_{10\text{-}16}$—$(O-C_2H_4)_{1\text{-}25}$—$OH$, such as octaethylene glycol monododecyl ether and pentaethylene glycol monododecyl ether; polypropylene glycol alkyl ethers having the formula: $CH_3$—$(CH_2)_{10\text{-}16}$—$(O-C_3H_6)_{1\text{-}25}$—$OH$; glucoside alkyl ethers having the formula $CH_3$—$(CH_2)_{10\text{-}16}$—(O-glucoside)$_{1\text{-}3}$-$OH$, such as decyl glucoside, lauryl glucoside, octyl glucoside; polyethylene glycol octylphenyl ethers having the formula $C_8H_{17}$—$(C_6H_4)$—$(O-C_2H_4)_{1\text{-}25}$—$OH$, such as Triton X-100; polyethylene glycol alkylphenyl ethers having the formula $C_9H_{19}$—$(C_6H_4)$—$(O-C_2H_4)_{1\text{-}25}$—$OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

In one embodiment, the surfactant is N-cis-13-docosenoic-N,N-bis(2-hydroxymethyl)-N-methyl ammonium chloride, and/or a combination of an alkyl polyglycoside, an ethoxylated alcohol, and a triethyleneglycol monobutyl ether. In another embodiment, the surfactant in the composition comprises a surfactant chosen from the group consisting of ethylene oxide propylene oxide block copolymers; fatty amines; fatty polyamines; hydrophilically modified amines; ethoxylated derivatives of hydrophilically modified amines; ethoxylated derivatives of polyamines; propoxylated derivatives of hydrophilically modified amines; propoxylated derivatives of polyamines; ethoxylated tallow triamine; ethoxylated oleyl amine; soya ethylenediamine; tallow diethylene triamine; soya amines; ethoxylated soya amines; and derivatives or combinations thereof. In still another embodiment, the surfactant is a betaine surfactant, such as erucic amidopropyl dimethyl betaine or oleoylamidopropyl dimethyl betaine.

In an alternative embodiment, the surfactant may be a dendritic surfactant, and/or a dendritic extended surfactant. A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group in one non-limiting embodiment. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. The molecular weight of the dendritic surfactant may range from about 320 g/mol to about 7,572 g/mol, alternatively from about 455 g/mol to about 5,455 g/mol, or from about 530 g/mol to about 3,360 g/mol in another non-limiting example. Dendritic surfactant molecules are sometimes called "hyperbranched" molecules.

A dendritic extended surfactant is a dendritic surfactant having a non-ionic spacer arm between the hydrophilic group and a lipophilic tail. The non-ionic spacer-arm extension may be the result of polypropoxylation, polyethoxylation, or a combination of the two with the polypropylene oxide next to the tail and polyethylene oxide next to the head, in non-limiting embodiments.

In one non-limiting embodiment, the spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like.

In a particular embodiment, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups in one non-limiting embodiment. These portions are generally in blocks, rather than being randomly mixed. In one embodiment, the spacer arm extension may be a poly-propylene oxide chain.

In one embodiment, the surfactant is a water-wetting surfactant. As defined here, a water-wetting surfactant or water-wetting agent is a surfactant that when dissolved in a drop of water on a solid surface, decreases the contact angle between the drop and the surface. For instance, a drop of pure water on a certain substrate may have a contact angle of 80-100°, while a drop of a solution comprising 0.05-0.5 wt % water-wetting surfactant relative to a total weight of the drop may have a contact angle of 130-150° on the same type of surface. A water-wetting surfactant aids in replacing an air phase with an aqueous liquid phase at a surface. Likewise, a water-wetting surfactant may allow an aqueous liquid phase to replace oil or a non-polar phase in contact with a surface, such as the surface of a barite particle in a filter cake. In other words, a water-wetting surfactant may be used to water wet the filter cake.

In one embodiment, the surfactant may be a viscoelastic surfactant (VES). Conventional surfactant molecules are characterized by having one long hydrocarbon chain per surfactant head-group. In a viscoelastic gelled state these molecules aggregate into worm-like micelles. Viscoelastic gel breakdown occurs when the fluid contacts the oil in an oil-based filter cake, which causes the micelles to change structure or disband. A viscoelastic gel is a gel that has elastic properties, meaning that the gel at least partially returns to its original form when an applied stress is removed. Viscoelastic surfactants act as reversible thickening agents so that, in a filter cake removal composition, the viscosity changes significantly when in contact with an oil-based filter cake. In this way the composition is able to preferentially penetrate an oil-based filter cake. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

In one embodiment, the composition further comprises an aqueous liquid, which may be water, brine, seawater, or freshwater, and may be present at a weight percent of 24-77 wt %, preferably 30-60 wt %, more preferably 32-45 wt % relative to a total weight of the composition. An aqueous liquid taken from a natural source, such as an aquifer, lake, or ocean, and may be filtered to remove large solids before being mixed to form the composition. A brine is an aqueous mixture of one or more soluble salts, such as sodium chloride, potassium chloride, calcium chloride, calcium bromide, sodium bromide, potassium bromide, or zinc bromide, and has at least 30 g soluble salts per L solution. Sea water or water from a salt lake may be considered a brine, or a brine may be formed by mixing water or freshwater with soluble salts or a solution comprising soluble salts. In alternative embodiments, an aqueous liquid may be present in the composition at a lower weight percentage, with the mutual solvent compensating with a higher weight percentage, such as 17-20 wt %, or 20-25 wt %, relative to a total weight of the composition.

In one embodiment, the composition has a pH of 10-14, preferably 10.5-13.5, more preferably 11-13. In an alternative embodiment, the composition may have a lower pH while still being considered basic, such as a pH of 8.0-9.5, preferably 8.8-9.2. In other alternative embodiments, the composition may have a more neutral pH of 6.8-8.0, preferably 7.1-7.8. In other embodiments, the composition may have a pH that is greater than 14. In some embodiments, a pH of the composition may decrease over time. For instance, a composition just mixed may have a pH of about 12, and after 0.5-1 h, the pH may decrease to about 9.0 while in contact with a filter cake.

In one embodiment, the composition further comprises 0.05-2.00 wt %, preferably 0.10-1.50 wt %, more preferably 0.50-1.00 wt % of an emulsifier or a second surfactant with respect to the total weight of the composition. As defined here, an emulsifier is a compound added to two immiscible fluids, in order to disperse one fluid within the other. This emulsifier is not the same compound as the surfactant in the composition, and the second surfactant is not the same compound as the surfactant in the composition. However, the emulsifier may also be considered a type of surfactant, and thus, a compound that is different than the surfactant in the composition may be considered as both an emulsifier and a second surfactant. The emulsifier may be needed to disperse the mutual solvent with the other components of the composition for effective removal of the oil from a filter cake.

The emulsifier or second surfactant may be one of the surfactants listed previously, or preferably an ethoxylated alcohol, an ethoxylated glycol, an ethoxylated phenol, a propoxylated alcohol, a propoxylated glycol, a propoxylated phenol, an ethoxylated and propoxylated alcohol, an ethoxylated and propoxylated glycol, an ethoxylated and propoxylated phenol, or a combination thereof. In one embodiment, the second surfactant may be considered a co-surfactant, where it is used to adjust some chemical or physical property of the primary surfactant. For instance, a co-surfactant may increase the salt tolerance beyond that of the primary surfactant, further lowering interfacial tension. Typical co-surfactants include linear alcohol ethoxylates, nonylphenol ethoxylates, and dodecylphenol ethoxylates. In a particular embodiment, the co-surfactant is sodium dodecyl benzene sulphonate.

In one embodiment, the composition comprises an emulsifier that is not a surfactant. Examples of this type of emulsifier include sodium salts of citrate, gelling agents, cellulose, guar gum, sodium alginate, sodium phosphates, and glycoproteins. In certain cases, an emulsifier may act as a starch complexing agent, a crystallization inhibitor, or an aerating agent.

In an alternative embodiment, the composition may not have a surfactant and may comprise an emulsifier that is not a surfactant. In another alternative embodiment, the composition may comprise a surfactant that is also considered an emulsifier, for example, a viscoelastic surfactant (VES), and may not contain additional surfactants or emulsifiers. In another alternative embodiment, the composition may comprise three distinct compounds of a surfactant, a second surfactant, and an emulsifier that is not a surfactant.

In one embodiment, the composition may further comprise other components, such as alcohols, glycols, organic solvents, soaps, fragrances, dyes, dispersants, pH control additives or buffers, acids or bases, water softeners, bleaching agents, antifouling agents, antifoaming agents, antisludge agents, catalysts, corrosion inhibitors, corrosion inhibitor intensifiers, viscosifiers, diverting agents, oxygen scavengers, carrier fluids, fluid loss control additives, friction reducers, stabilizers, rheology modifiers, gelling agents, scale inhibitors, breakers, salts, crosslinkers, salt substitutes, relative permeability modifiers, sulfide scavengers, fibers, microparticles, nanoparticles, bridging agents, shale stabilizing agents (such as ammonium chloride, tetramethyl ammonium chloride, or cationic polymers), anti-foaming agents, clay treating additives, polyelectrolytes, non-emulsifiers, freezing point depressants, iron-reducing agents, biocides/bactericides and the like, provided that they do not interfere with the controlled dissolution of the filter cake as described herein. These components, when present, may be present in the composition at a weight percentage of 0.01-5 wt %, preferably 0.5-3 wt %, more preferably 0.8-2 wt %, relative to a total weight of the composition.

In one embodiment, the composition may be formed by adding and mixing the components in any order, and then continuing to mix until a stable, uniform mixture is formed. In one embodiment, the composition may be formed by starting with a base solvent, such as water, brine, seawater, or freshwater, adding a component, mixing to uniformity, and then repeating for the remaining steps. Alternatively, two or more components may be added at a time and mixed, and in one embodiment, the composition may be heated while mixing, for example, to a temperature of 110-200° F., preferably 150-180° F., in order to more quickly dissolve certain components. The mixing may be performed by flowing through or across a static mixer, or with a turbine, blade, impeller, drum mixer, stir bar, paddle, or through some other form of agitation or blending.

In one embodiment, composition may have a viscosity of 0.5-200 cp, preferably 1-50 cp, more preferably 1-20 cp, even more preferably 1-10 cp at a temperature of 20-30° C. The composition may have a density of 58-100 lb/ft$^3$, preferably 62-90 lb/ft$^3$, more preferably 65-75 lb/ft$^3$. In one embodiment, one or more components of the composition may be encapsulated or modified for delayed release or delayed action. In one embodiment, the composition may be biodegradable.

In one embodiment, the composition consists of a chelating agent, a converting agent, a polymer removal agent, a mutual solvent, a surfactant, at the weight percent concentrations as mentioned previously, in a base solvent. The base solvent, as mentioned previously, may be water, brine, seawater, or freshwater. In a related embodiment, the composition consists of a chelating agent, a converting agent, a polymer removal agent, a mutual solvent, a surfactant, and an emulsifier in a base solvent. In a related embodiment, the composition consists of a chelating agent, a converting agent, a polymer removal agent, a mutual solvent, a surfactant, and a second surfactant in a base solvent. In one embodiment, the composition does not comprise EDTA. In one embodiment, the composition does not have a pH equal to or below 7.0. In one embodiment, the composition does not comprise brine. In one embodiment, the composition does not comprise a persulfate salt. In one alternative embodiment, the composition comprises both an oxidizing agent and an enzyme. In one alternative embodiment, the mutual solvent is not 2-butoxyethanol. In one embodiment, the composition does not comprise a base oil and/or a mineral oil. In one embodiment, the surfactant is not a viscoelastic surfactant. In another alternative embodiment, the composition does not comprise a converting agent.

In one embodiment, the composition has a corrosion rate of 0.00001-0.01 lb/ft$^2$, preferably 0.0001-0.005 lb/ft$^2$, more preferably 0.0005-0.001 lb/ft$^2$ per 6 h in contact with a steel surface at 325-375° F., preferably 330-370° F., more preferably 335-365° F. The pressure may be atmospheric pressure, or 200-400 psi, preferably 250-350 psi. Here, the corrosion rate uses a unit of lb/ft$^2$ as a measure of the corrosion weight loss in pounds mass per square foot of pre-exposed surface area. The unit may also be written as lbm/ft², where "lbm" denotes pounds as a mass unit, rather than pounds as a force unit. The industry accepted corrosion rate is 0.05 lb/ft² per 6 h. The corrosion rate may be measured in a controlled environment by weighing a piece of steel, such as a steel coupon, measuring its surface area, contacting it with a corrosive agent for a certain time and at a certain temperature and pressure, removing the corrosive agent, and again weighing the piece of steel in order to find the corrosive weight loss. The coupon may be a strip, a disc, or a cylinder, or may be some other shape designed for a testing cell or a part of a drill pipe, such as a joint between segments. Alternatively, the corrosion rate of the composition in contact with a steel surface may be measured in units of mils/yr, (also denoted as MPY, mils penetration per year) which is the decrease in thickness in mils of a surface due to corrosion loss over a year. 1 mil is equal to 0.001 inches, or 25.40 µm, and in one embodiment, the composition in contact with a steel surface at 325-375° F. for 6 hours has a corrosion rate in mils penetration per year of 10-500 mils/yr, preferably 15-200 mils/yr, more preferably 20-50 mils/yr. Due to the low corrosion rate of the composition, a corrosion inhibitor may not be necessary. However, in an alternative embodiment, a corrosion inhibitor may be mixed with the composition to a weight percentage of 0.01-1 wt %, preferably 0.1-0.8 wt % relative to a total weight of the composition and corrosion inhibitor.

As defined here, steel is an alloy having 55-99.98 wt %, preferably 60-99.96 wt % of elemental iron, and may further comprise carbon, chromium, aluminum, nickel, molybdenum, manganese, vanadium, tungsten, cobalt, titanium, niobium, copper, zirconium, calcium, boron, phosphorus, and/or silicon. The steel may be a low-carbon steel, a medium-carbon steel, a high-carbon steel, or an ultrahigh-carbon steels. Each has a different carbon content, wherein the carbon content has an effect on mechanical properties, with increasing carbon content leading to increased hardness and strength. More preferably, the physical properties and chemical composition of the carbon steel are suitable for application in subterranean formations, including elevated temperatures and pressures, flow of gases, fluids and solids and the presence of corrosive gases. Preferred carbon steels are carbon steels wherein at least one of manganese or chromium is present in an amount of 0.75 wt % in relation to the total steel alloy weight. These carbon steels include, but are not limited to, N-80, L-80, P-110, Q-125, J-55, C-75, C-90, C-95, QT-800, QT-900, 5LX-42, and 5LX-52 carbon steels.

In one embodiment the steel is low-carbon steel, which contains up to 0.30 wt % carbon with respect to a total weight of the steel alloy. The carbon content for high-formability steels is less than 0.10 wt % of carbon, with up to 0.4 wt % manganese with respect to a total weight of the steel alloy. For rolled steel structural plates and sections, the carbon content may be increased to approximately 0.30 wt %, with higher manganese content up to 1.5 wt %. These materials may be used for stampings, forgings, seamless tubes, and boiler plates.

In another embodiment the steel is medium-carbon steel, with medium-carbon steels being similar to low-carbon steels except that the carbon content ranges from 0.30 to 0.60 wt % and the manganese content ranges from 0.60 to 1.65 wt % with respect to a total weight of the steel alloy.

In yet another embodiment the steel is a high-carbon steel, with high-carbon steels containing from 0.60 to 1.00 wt % of carbon with manganese contents ranging from 0.30 to 0.90 wt % with respect to a total weight of the steel alloy.

In another embodiment the steel is an ultrahigh-carbon steel, with ultrahigh-carbon steels being experimental alloys containing 1.25 to 2.0 wt % carbon with respect to a total weight of the steel alloy.

In a preferred embodiment, the steel is a low-carbon steel or an N80 carbon steel. In one embodiment, the composition has an interfacial surface tension of 15-30 dynes/cm, preferably 17-26 dynes/cm, more preferably 20-24 dynes/cm with air. For comparison, the interfacial surface tension between water and air is 70-75 dynes/cm.

According to a second aspect, the present disclosure relates to a single-step method of dissolving an oil-based filter cake in a wellbore. This method involves contacting the oil-based filter cake in the wellbore with the composition of the first aspect for 18-30 h, preferably 20-28 h, more preferably 22-26 h, wherein at least 80 wt %, preferably at least 82.5 wt %, more preferably at least 85 wt % of the oil-based filter cake dissolves with respect to a total weight of the filter cake prior to the contacting.

Dissolving a filter cake, as described here, means that the filter cake may break apart, dissolve, disperse, or disintegrate from a surface or from a portion of a filter cake. A method to dissolve a filter cake may be considered a "treatment," or a method of "treating" a filter cake. Preferably the surface is a wall of a wellbore, which may comprise shale, carbonate, sandstone, other minerals, rocks, or geological formations. In other embodiments, the surface may be concrete, a steel casing, a drill bit, an autoclave, a steel coupon, a ceramic filter, glass, or a glass frit. Preferably, the dissolving and removing of a filter cake as described by the method is a result of the components of the composition reacting with different compounds within the filter cake, as previously described. However, the dissolving and removing may also result from the physical turbulence or flow of fluids against the filter cake, or by diffusion of a fluid into a filter cake or between a filter cake and the surface. In one embodiment, removing a filter cake from a surface may not totally remove or dissolve the filter cake. For instance, a filter cake in a wellbore may be treated with the composition as described while leaving a filter cake residue in the wellbore having a weight that is 0.5-20 wt %, preferably 1-15 wt % of the original total filter cake weight. Preferably this filter cake residue does not cause significant formation damage or significantly decrease hydrocarbon extraction yields. In one embodiment, a porous rock, such as Berea sandstone, has an initial permeability of 145-155 mD. After filter cake formation and then treatment with the composition to remove the filter cake, the permeability may be decreased to 137-144 mD, corresponding to a retained permeability of 88-99.3%, preferably 90-99.0%, more preferably 94-98.5%.

In an alternative embodiment, the composition may be formed with one less or two less components, and still be effective for removing a filter cake. For instance, an alternative composition may be formed without a converting agent, but with a chelating agent present, and may be able to dissolve or disperse the barite in the filter cake in the single-step method.

In practice, the single-step method of dissolving a filter cake from a wellbore can be applied in various ways. For example, the composition can be injected into the wellbore to dissolve the filter cake within. Alternatively, the composition can be injected directly at the site of a filter cake. Alternatively, the composition can be allowed to circulate in the wellbore for a certain period of time. Alternatively, the composition may be left in the wellbore to soak the filter cake. Alternatively, the wellbore containing the filter cake may be pre-washed by water and/or mutual solvent and/or pretreated with a surfactant before being treated with an alternative composition that contains no surfactants. Alternatively, the composition may be used as a carrier fluid for an additional use, such as gravel packing.

The single-step method of the present disclosure is applicable in numerous different environments. It can be used to remove barite filter cake produced from drilling, production, completion, workover, or stimulation activity, either produced intentionally or unintentionally. It can be used in screen-only completions or gravel pack completions, an open hole or a cased hole, vertical or highly deviated wells. The composition may be used as single-application soak or circulating fluid in which the composition also serves as a carrier fluid for, e.g., a gravel pack operation; in conjunction with a gelling agent or viscoelastic surfactant (e.g., Clear-FRAC™) or alone, with a variety of clean-up tools and other fluid additives (e.g., anti-corrosive agents) or dissolution components. Since the problem of placement and uniform dissolution are present in virtually every instance, the composition and methods of the present disclosure are readily applicable to any scenario in which it is desirable to remove a filter cake from a wellbore or near-wellbore region in a formation, regardless of whether the filter cake is produced during drilling or during other post-drilling operations (e.g., fluid-loss control pill, gravel pack operation, fracturing, matrix acidizing, and so forth). In one embodiment, the composition may be used not necessarily to remove a filter cake, but to remove the drilling fluid particles from the pores of a formation.

In one embodiment of the method, the oil-based filter cake comprises 30-90 wt %, preferably 35-85 wt %, more preferably 40-80 wt % barium sulfate with respect to a total weight of the filter cake prior to the contacting. The barium sulfate may be in the form of particles having diameters of 20-55 µm, preferably 25-50 µm, more preferably 30-45 µm. In an alternative embodiment, an oil-based filter cake may be formed from a drilling fluid containing a lower weight percentage of barite, for example, 10-30 wt %, preferably 12-20 wt % relative to a total weight percentage of the filter cake, and this lower weight percentage may result from the presence of other solids in the filter cake, such as bentonite clay, mica, walnut shells, particles of xanthum gum or modified cellulose, asphalts, gilsonites, sand, silicates, dolomite, calcite, hematite, and other weighting materials. A filter cake may comprise a corrosion inhibitor such as an amine, a hydrazine, including hexamine, phenylenediamine, and dimethylethanolamine; sulfite, ascorbic acid, benzotriazole, zinc dithiophosphates, zinc phosphate, tannic acid, zinc salts of organonitrogens, and benzalkonium chloride. The filter cake may have a thickness of 0.5-3.0 mm, preferably 0.7-2.8 mm, more preferably 0.8-2.5 cm. In an alternative embodiment, the filter cake may have a thickness less than 0.5 mm or greater than 3.0 mm.

In one embodiment, the oil-based filter cake may have a composition similar to an oil-based drilling fluid, but with the weight percentage of liquids and solvents decreased from about 30-40 wt % relative to a total weight of the drilling fluid to about 10-20 wt % relative to a total weight of the filter cake. In an alternative embodiment, the filter cake may be a water-based filter cake, and may be contacted with the composition or a modified version of the composition.

In one embodiment of the method, a ratio of a total volume of the composition to the total weight of the filter cake prior to the contacting is 20-30 mL/g, preferably 22-28 mL/g, more preferably 23-27 mL/g. In other embodiments, however, the ratio may be much lower, such as 5-15 mL/g, or much higher, such as 40-55 mL/g or 60-70 mL/g. A high ratio may result from removing only small amounts of a filter cake in a wellbore, or from a composition being continually flushed through a wellbore.

In one embodiment of the method, a temperature in the wellbore is 225-380° F., preferably 240-365° F., more preferably 250-350° F. In some embodiments, the temperature may vary within a single wellbore, for instance, in one location of a vertical wellbore, the temperature may be 255-265° F., while 2,000 ft above may be 120-150° F., and 1,000 ft below may be 280-300° F. Across substantially horizontal segments of the wellbore, the temperature may not vary significantly. Preferably the range in temperatures in the wellbore does not significantly decrease the effectiveness of the composition in removing a filter cake. In one embodiment, the temperature in the wellbore may be adjusted by heating or cooling the composition before transferring it to a wellbore.

Different temperatures may have different effects on the interaction of certain components of the composition with the filter cake. For instance, higher temperatures may improve dissolution of the oil by the surfactant and may improve the activity of an oxidizing agent. On the other hand, higher temperatures may lead to faster degradation of an enzyme and a decrease in chelator activity. A person having ordinary skill in the art may be able to determine appropriate temperatures for certain compositions.

In one embodiment of the method, a pressure difference in the wellbore is 180-450 psi, preferably 200-430 psi, more preferably 250-400 psi. The pressure may be adjusted and applied by pumps and/or valves at the ground level. In one embodiment, the applied pressure may be changed while contacting a filter cake with the composition in order to benefit a different process of the filter cake dissolution, for instance a certain pressure for the dissolution of the oil by the surfactant, and a different pressure for the reaction by the polymer removal agent. In some instances, applied pressure may be necessary to prevent the composition or drilling fluids from boiling. In addition, applied pressure may be necessary to counter the formation pressure.

In one embodiment of the method, the contacting forms an emulsion, preferably a microemulsion. As defined here, an emulsion is a fluid mixture where at least one liquid is dispersed as droplets in a second liquid. Preferably, the emulsion comprises the oil base of the drilling fluid dispersed in the composition as droplets having diameters of 10 nm-100 µm, preferably 100 nm-50 µm, more preferably 1-15 µm. The droplets may be amorphous, liquid-crystalline, or any mixture thereof. The emulsion may be considered a microemulsion, a nanoemulsion, a miniemulsion, a macroemulsion, or combinations thereof. Microemulsions are thermodynamically stable, macroscopically homogeneous mixtures of at least three components: an aqueous phase, a non-aqueous phase, and a surfactant, and are often synonymous with nanoemulsions. Microemulsions may comprise dispersed droplets with diameters of 1-100 nm, preferably 10-50 nm, while miniemulsions comprise dispersed droplets with diameters of 50 nm-1 µm. Macroemulsions may comprise droplets with diameters of 1-100 µm. Microemulsions form spontaneously and differ markedly from the thermodynamically unstable macroemulsions, which depend upon intense mixing energy for their formation. In a preferred embodiment, the formation of a microemulsion enables the filter cake particles to be more effectively removed from the pores of a porous rock or a formation wall.

Following the contacting, in one embodiment, the method may further comprise a step of flushing away a dispersed filter cake with a low concentration of organic or non-organic acid as commonly known in the art to increase permeability.

According to a third aspect, the present disclosure relates to a multistep method of dissolving an oil-based barite filter cake in a wellbore. This multistep method involves first contacting the oil-based barite filter cake with a mixture comprising a mutual solvent and a surfactant to produce a cleaned barite filter cake. The cleaned barite filter cake is then contacted with a solution comprising the polymer removal agent, the chelating agent, and the converting agent to produce dissolved and/or chelated barium.

In this multistep method, the mutual solvent, surfactant, polymer removal agent, converting agent, and chelating agent may be any of those previously mentioned for the composition, and each may be at concentrations previously mentioned for the composition. Alternatively, higher concentrations may be used, for instance, the mixture in the first step may comprise the surfactant at a weight percent of 8-10 wt % relative to a total weight of the mixture. The total fluid volume per mass of filter cake at each step may be similar to what has been described for the single-step method, or the total fluid volume per mass may be higher as each step decreases the total mass of the filter cake.

In the first step, the mixture of the mutual solvent and surfactant may be contacted with the oil-based barite filter cake for 6-16 h, preferably 8-14 h, more preferably 9-12 h. In one embodiment, the mixture further comprises 78-97 wt %, preferably 80-95 wt % water or brine with respect to a total weight of the mixture. Preferably this step dissolves and removes a majority of the oil on the oil-based barite filter cake, producing a cleaned barite filter cake. In one embodiment, surfactant forms an emulsion of oil droplets dispersed in the mixture, wherein the emulsion may be a microemulsion as described previously. The total weight of the oil in the oil-based barite filter cake may be decreased by 50-98%, preferably 60-95%, more preferably 70-90% relative to the total weight of the oil in the oil-based barite filter cake before the contacting.

In the next step, the cleaned barite filter cake may be contacted with a solution comprising the polymer removal agent, the chelating agent, and the converting agent to produce dissolved and/or chelated barium. This second contacting may be done for 18-30 h, preferably 20-28 h, more preferably 22-26 h. Here, the solution may comprise 48-85 wt %, preferably 60-82 wt %, more preferably 70-80 wt % water or brine relative to a total weight of the solution. Where the polymer removal agent is an enzyme, the solution may further comprise components to stabilize the enzyme, such as buffering agents, sodium borate, calcium formate, and/or propylene glycol. The polymer removal agent may break, dissolve, or dissociate the polymers on or within the cleaned barite filter cake as described previously. In one embodiment, breaking, dissolving, or dissociating the polymers on or within the cleaned barite filter cake better exposes the barium sulfate for reaction with the converting agent and the chelating agent. The cleaned barite filter cake, with or without polymers removed, may react with the converting agent and the chelating agent in the solution to produce dissolved and/or chelated barium.

In one embodiment of the multistep method, the oil-based filter cake comprises 30-90 wt %, preferably 35-85 wt %, more preferably 40-80 wt % barium sulfate with respect to a total weight of the filter cake prior to the contacting. In alternative embodiments, the multistep method may be used to remove a water-based filter cake, or filter cakes having different compositions or additives, as mentioned previously for the single-step method.

In another alternative embodiment, a multistep method may be done with three steps, rather than two. This three-step method involves contacting the oil-based barite filter cake with a mixture comprising a mutual solvent and a surfactant to produce a cleaned barite filter cake, contacting the cleaned barite filter cake with a polymer removal agent to produce a depolymerized barite filter cake, and then contacting the depolymerized barite filter cake with a converting agent and a chelating agent to produce dissolved and/or chelated barium.

This involves first contacting the oil-based barite filter cake with a mixture comprising a mutual solvent and a surfactant to produce a cleaned barite filter cake, as described previously.

In the next step, the cleaned barite filter cake may be contacted with the polymer removal agent to break, dissolve, or dissociate the polymers on or within the cleaned barite filter cake as described previously for the polymer removal agent. Here, the contacting may be done for 18-30 h, preferably 20-28 h, more preferably 22-26 h, in order to produce a depolymerized barite filter cake. In one embodiment, breaking, dissolving, or dissociating the polymers on or within the cleaned barite filter cake better exposes the barium sulfate for reaction at the next and final step. In one embodiment, the polymer removal agent is in a solution comprising 88-97 wt %, preferably 90-95 wt %, more preferably 91-94 wt % water or brine relative to a total weight of the solution. In another embodiment, where the polymer removal agent is an enzyme, the solution may further comprise components to stabilize the enzyme, such as buffering agents, sodium borate, calcium formate, and/or propylene glycol.

In the final step, the depolymerized barite filter cake may be contacted with a converting agent and a chelating agent to produce dissolved and/or chelated barium. The converting agent and chelating agent may be contacted for 8-20 h, preferably 10-18 h, more preferably 12-16 h. In one embodiment, the converting agent and chelating agent are in a solution comprising 60-85 wt %, preferably 70-82 wt %, more preferably 75-80 wt % water or brine relative to a total weight of the solution.

In an alternative embodiment of the multistep method, where two or more steps use potentially incompatible components, the wellbore may be flushed with water, brine, or some other solution in between two or more steps to minimize cross-contamination. In addition, such flushing may further remove filter cake from the wellbore as described previously.

The multistep method, the alternative three-step method or some other method with more than one step may enable components to be used that may otherwise be incompatible with each other in a single composition. For example, the polymer removal agent may be a metalloenzyme that might otherwise be denatured by the surfactant or inactivated by the chelating agent. A method with more than one fluid application step may enable the filter cake removal process to be monitored with each step, for instance, by analyzing the fluids during or after each application in the wellbore. This analyzing may be done with measurement while drilling (MWD) or logging while drilling (LWD) equipment or sensors. Additionally, solvent conditions, temperatures, and pressures may be adjusted with each step to increase the solubility and reactivity of the components.

The examples below are intended to further illustrate protocols for preparing, characterizing, and using the composition, and are not intended to limit the scope of the claims.

Example 1

Fluid Compatibility Tests

Figure 2A:
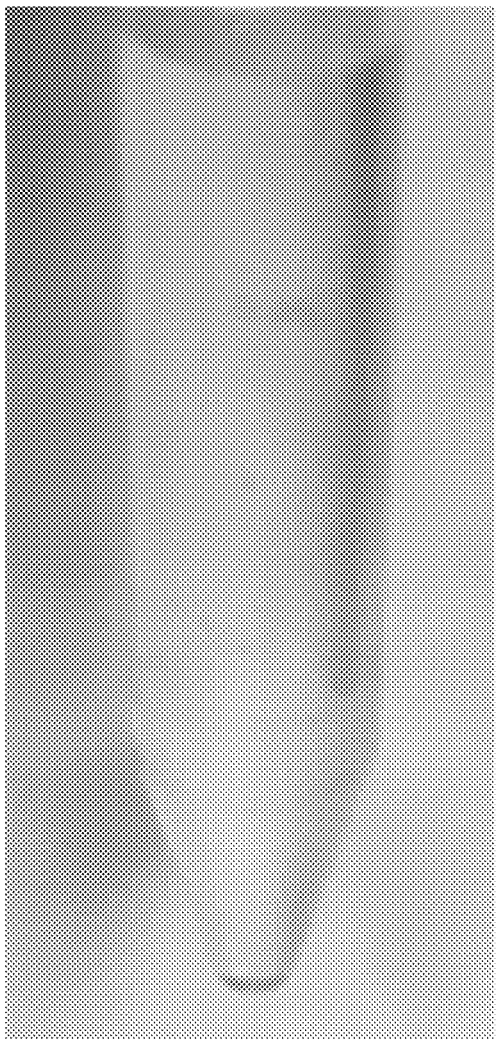
FIG. 2A is the formulation after mixing at room temperature.
Figure 2B:
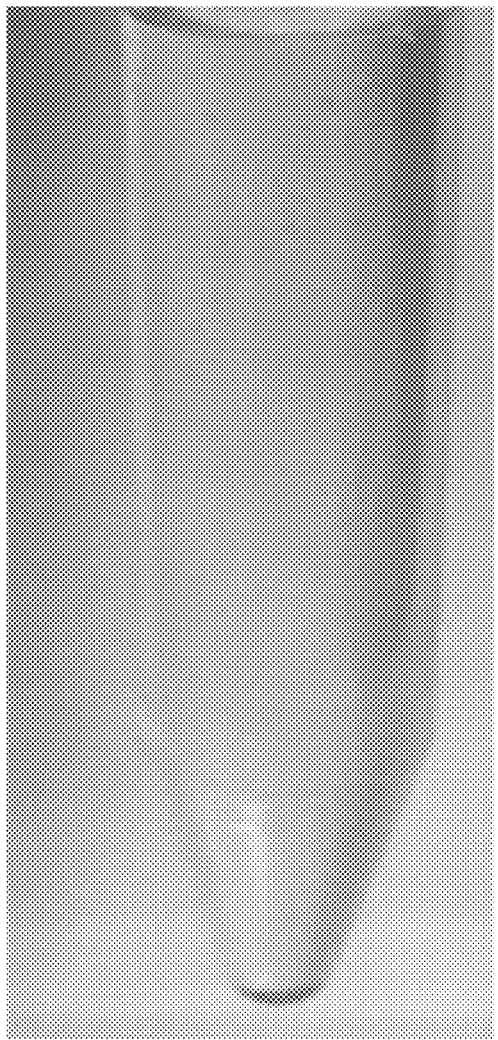
FIG. 2B is the formulation of FIG. 2A, after subjecting to high pressure and high temperature.

A fluid compatibility test was performed at room temperature using a glass tube and at high pressure and high temperature using a see-through-cell, as shown in FIG. 1. The sample composition was prepared and mixed at room temperature, and is shown in FIG. 2A. Then the sample was put in the see-through-cell, and then the temperature was increased to 270° F., and the pressure was increased to 300 psi and held for 24 hours. The sample was observed over time to assess the fluid compatibility in terms of any phase separation or precipitation. No phase separation or precipitation was noticed. The sample composition after the 24 hours is shown in FIG. 2B, which also has no noticeable phase separation or precipitation. These results indicate compatibility of the composition components at low and high temperatures.

Example 2

Solubility Tests

Figure 3A:
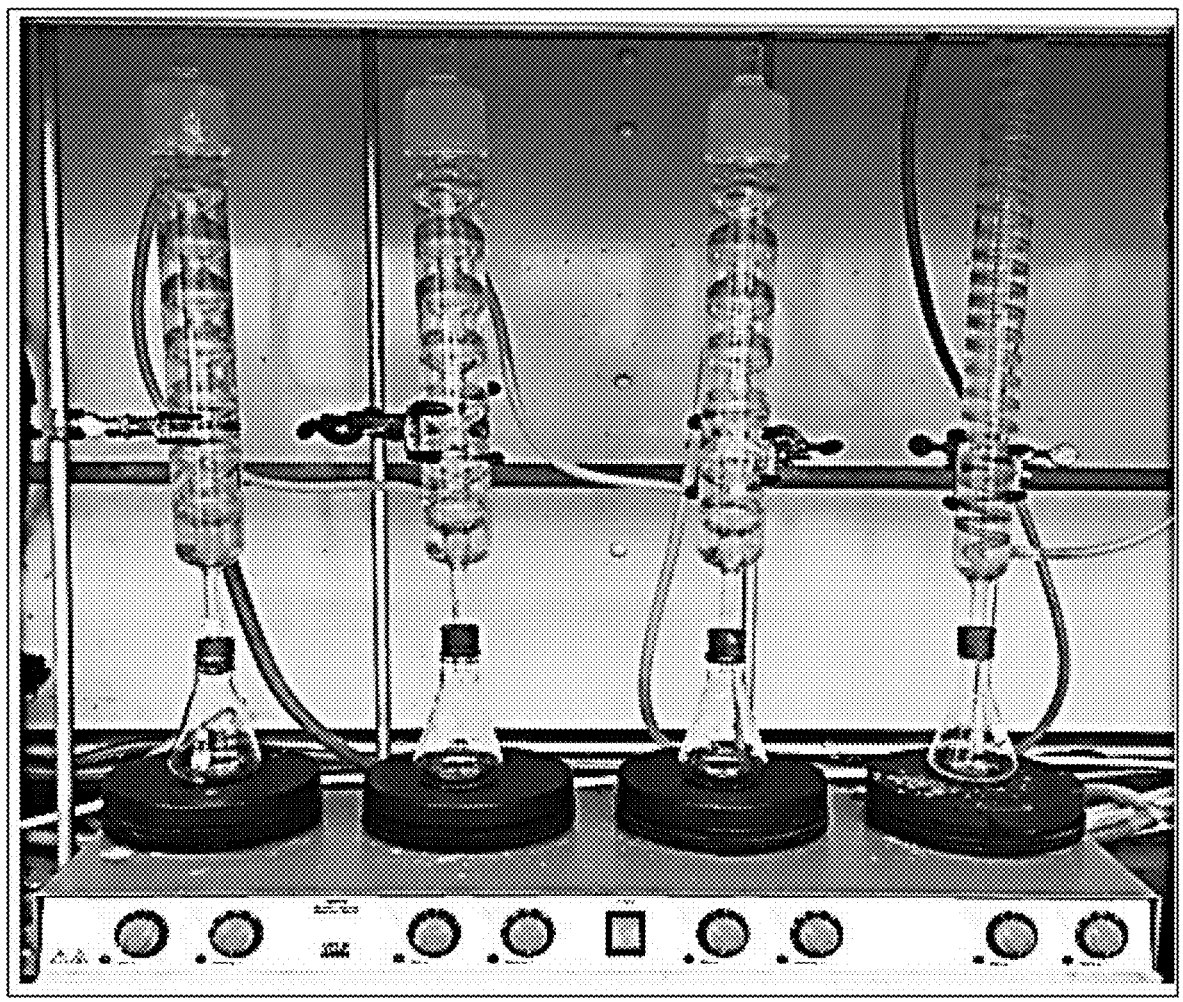
FIG. 3A is a photograph of the equipment used for the solubility test.
Figure 3B:
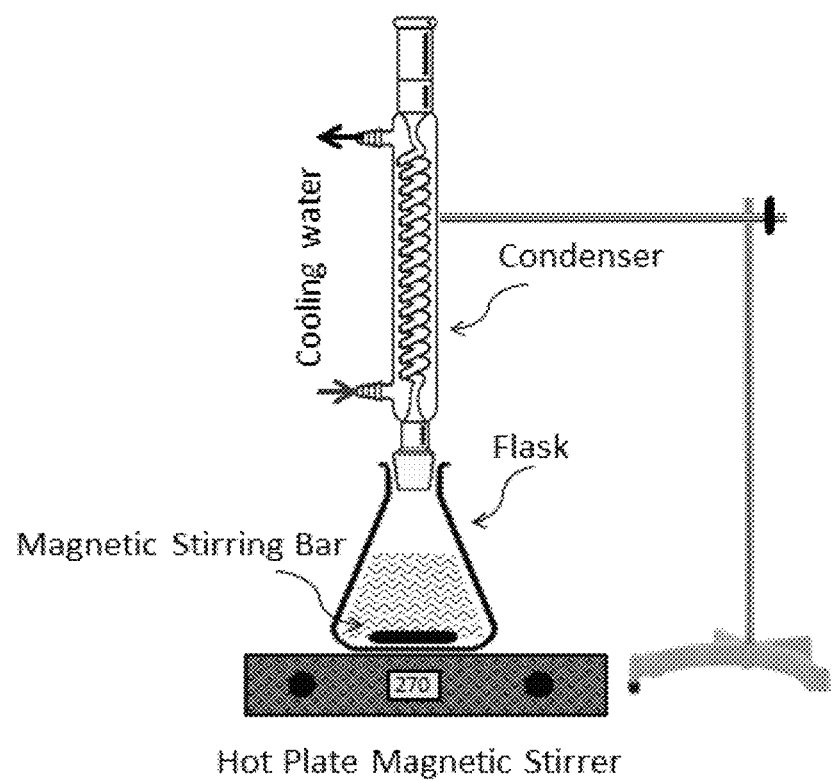
FIG. 3B is a diagram of the equipment used for the solubility test.
Figure 4:
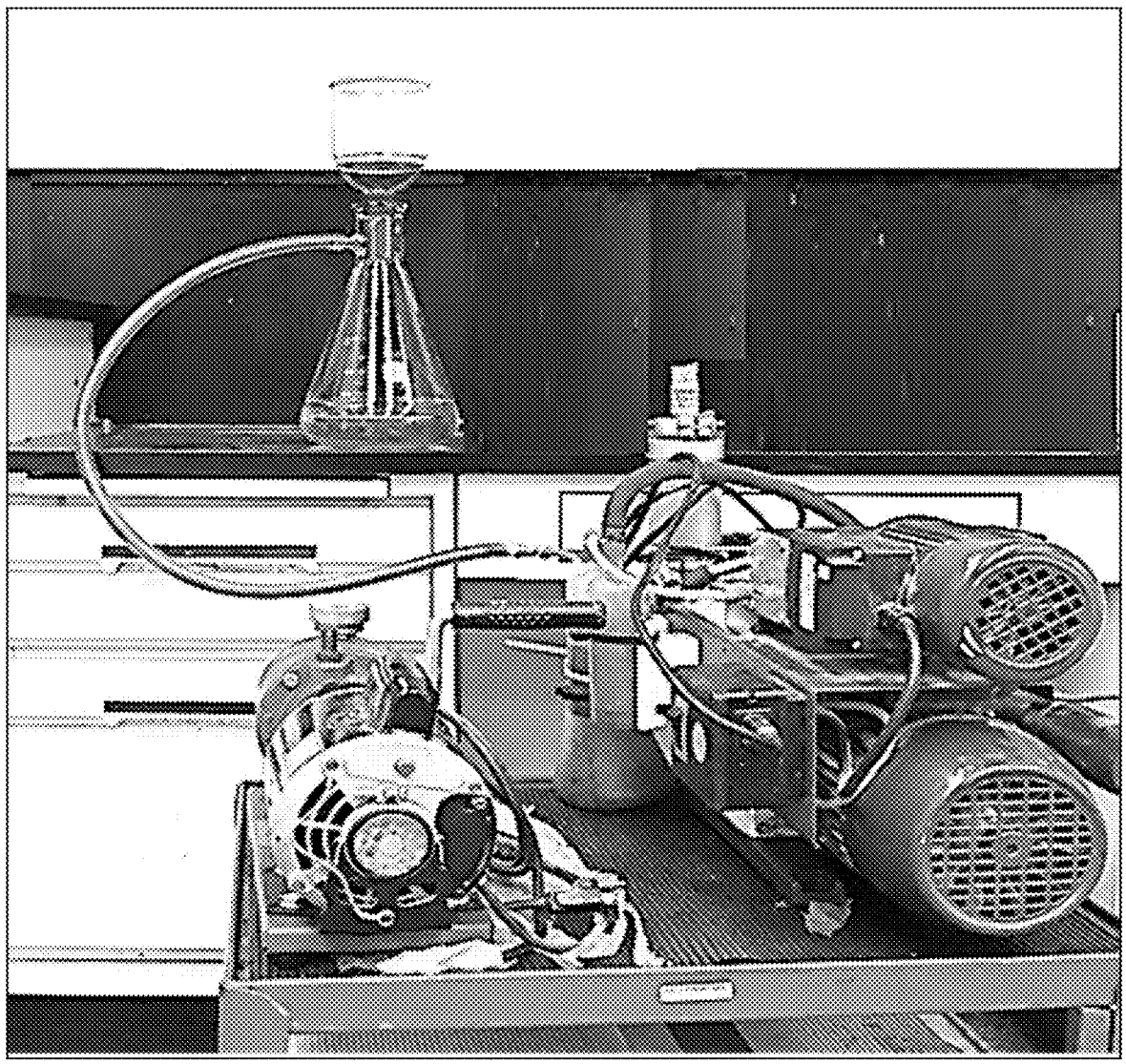
FIG. 4 is a photograph of the equipment used for filtering in the solubility test.

The solubility test was conducted using a hot plate magnetic stirrer, as shown in FIGS. 3A and 3B. A dry sample of filter cake solids was produced by drying a filter cake in an oven at 100° C. for 24 hours. The dry sample having a weight of $W_{solids}$ was placed in a glass flask, and then the fluid sample of the filter cake removal composition was added. The temperature and stirring RPM were then adjusted and a condenser was installed. The experiment was performed for different time periods. At the end of each experiment, the fluid sample with the remaining solids was filtrated using a vacuum pump and filter paper, as shown in FIG. 4. The filter paper has an initial weight of $W_{before}$. The remaining solid with the filter paper was dried at higher temperature and the combined weight of the remaining solid and filter paper, $W_{after}$, was obtained. The solubility was calculated by the following equation:

$$\text{Solubility, wt \%} = \frac{W_{solids} - (W_{after} - W_{before})}{W_{solids}} \times 100$$

Figure 5:
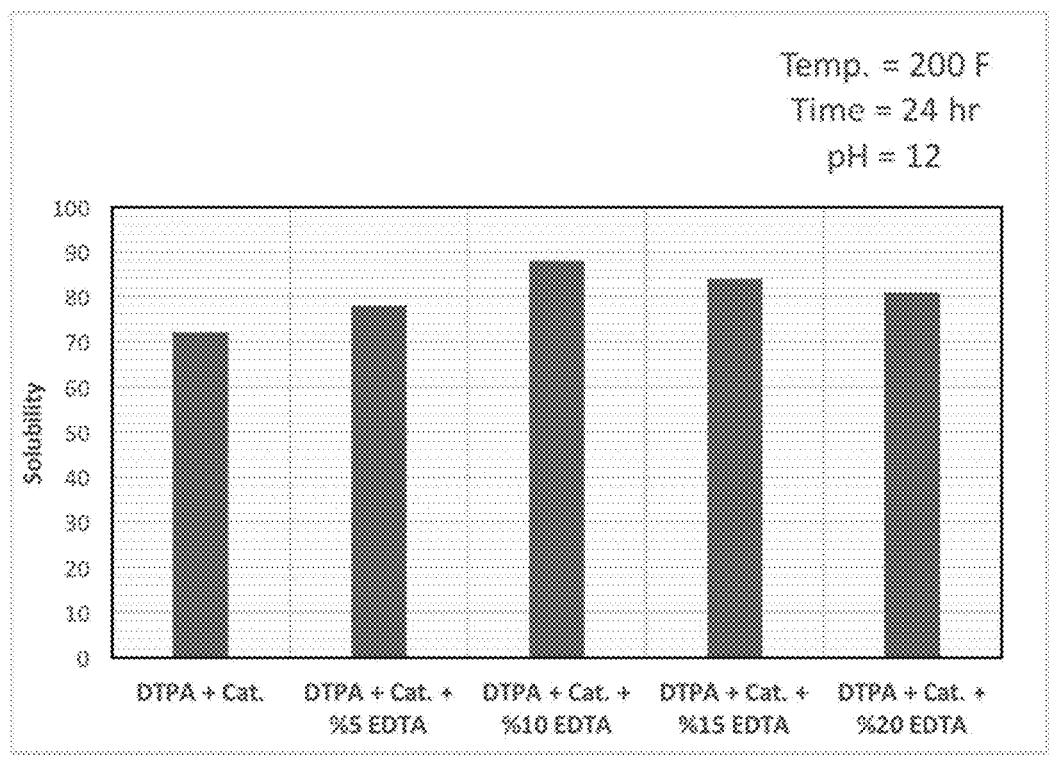
FIG. 5 shows the results of solubility tests where barite is contacted with different formulations.

FIG. 5 shows example solubilities of the dry sample in solutions with 7 wt % potassium carbonate, 20 wt % $K_5$-DTPA, and with different concentrations of EDTA. Here, a dry sample was stirred in each filter cake removal composition at a concentration of 4 g dry sample in 100 mL total solution for 24 h at 200° F. and a pH of 12.

Example 3

Fluid Loss Test, Filter Cake Formation, and Removal Efficiency

Figure 6:
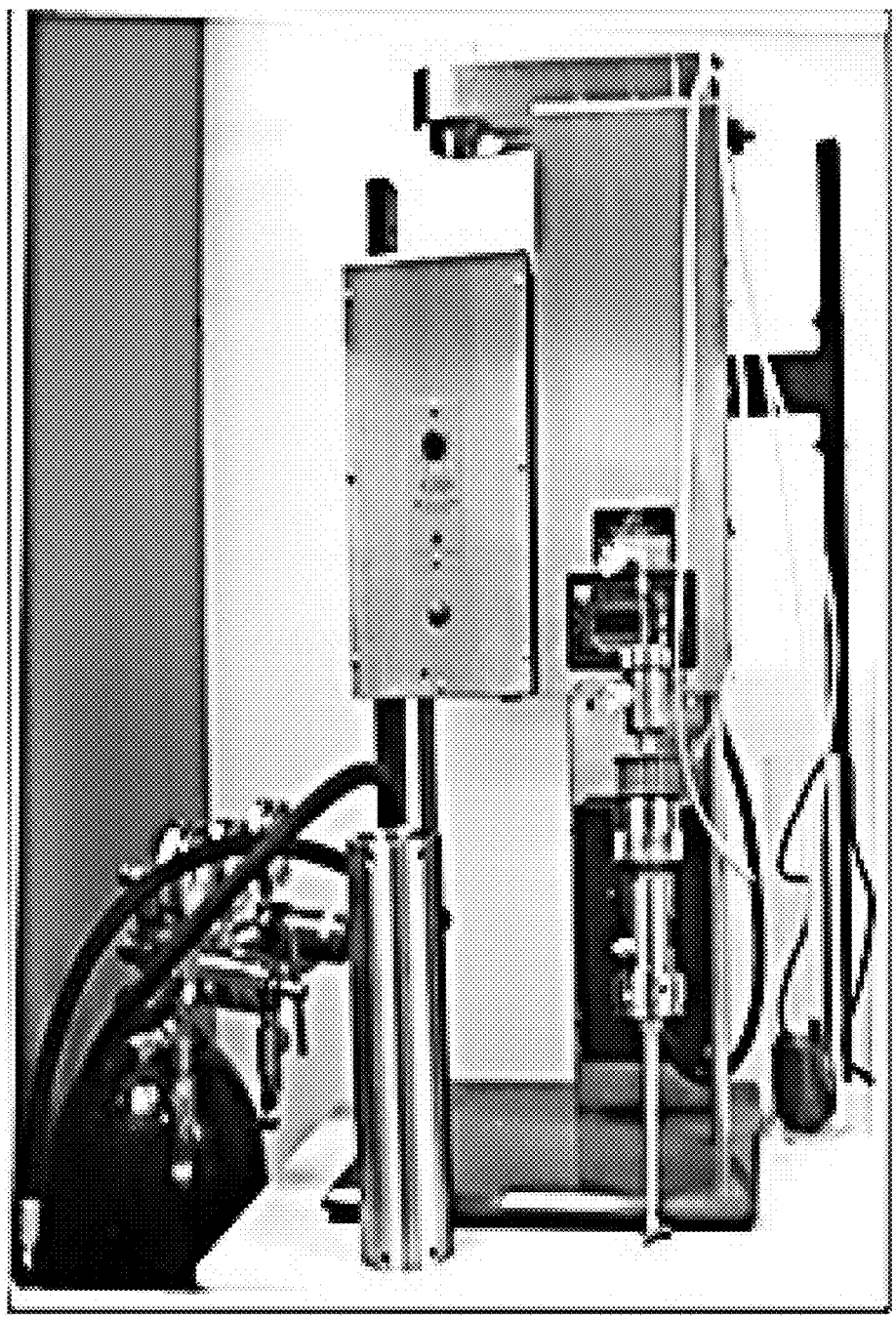
FIG. 6 is a photograph of the high pressure high temperature (HPHT) filter press used to test the formation, fluid loss, and removal of the filter cake.
Figure 7A:
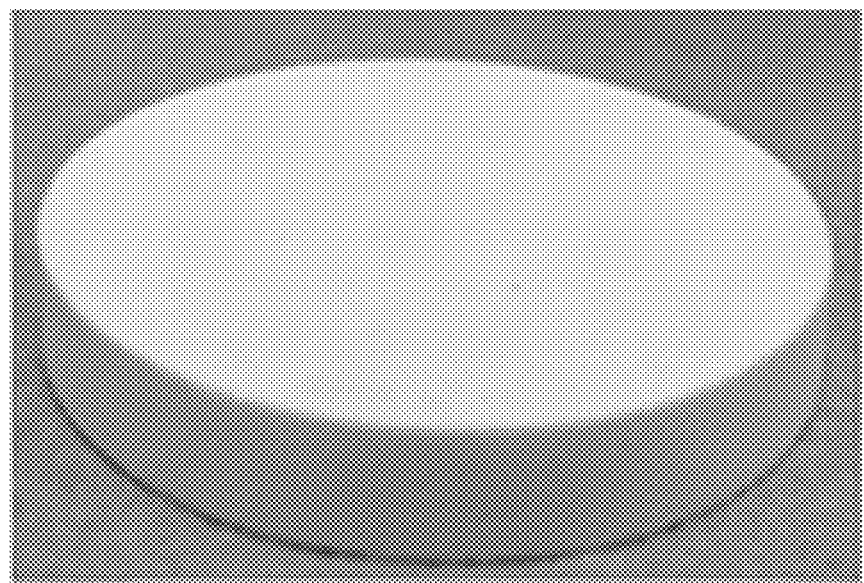
FIG. 7A is a photograph of the ceramic disc used in the HPHT filter press.
Figure 7B:
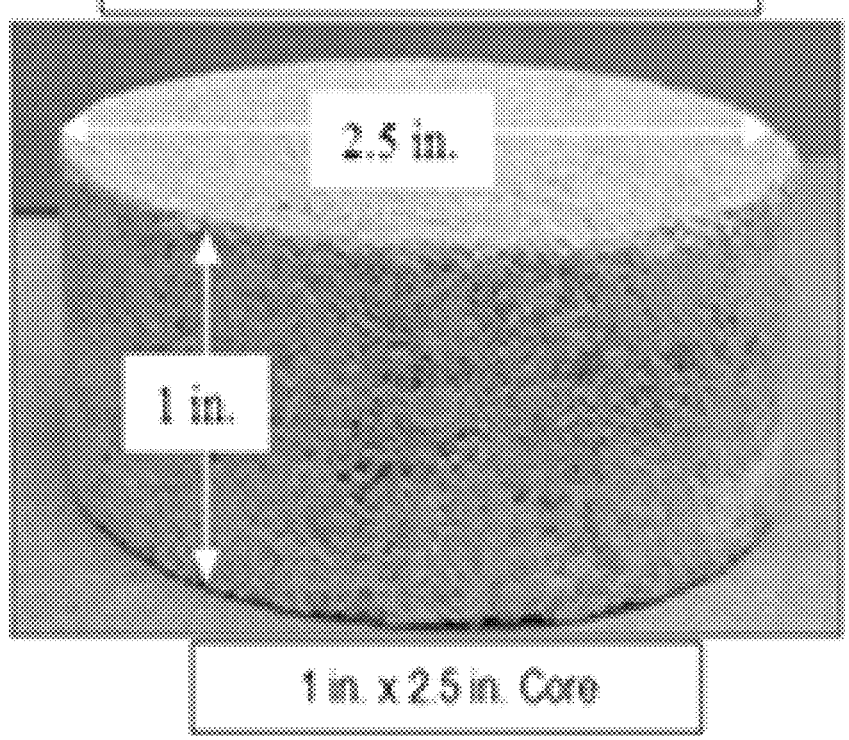
FIG. 7B is a photograph of the Berea sandstone core used in the HPHT filter press.

The static filtration process for the fluid loss test was performed using a modified HPHT (high pressure, high temperature) filter cell as shown in FIG. 6, at a temperature of 270° F. and a pressure difference of 300 psi. Ceramic discs (FIG. 7A) of 0.25 in. thickness and 2.5 in. diameter and cores of Berea sandstone cut to cylinders of 1 in. thickness and 2.5 in. diameter (FIG. 7B) were used separately in the modified cell. A drilling fluid was prepared having the following properties (Table 1):

TABLE 1

| Drilling fluid properties | | |
|---|---|---|
| Property | Value | Unit |
| Density | 93 | lb/ft$^3$ |
| PV | 38 | cP |
| YP | 15 | lb/100 ft$^2$ |
| 10 sec gel | 6.5 | lb/100 ft$^2$ |
| 10 min gel | 6 | lb/100 ft$^2$ |

The drilling fluid was placed in the cell. The cell was put in the heating jacket, and the system was adjusted to a desired pressure and temperature.

Figure 8:
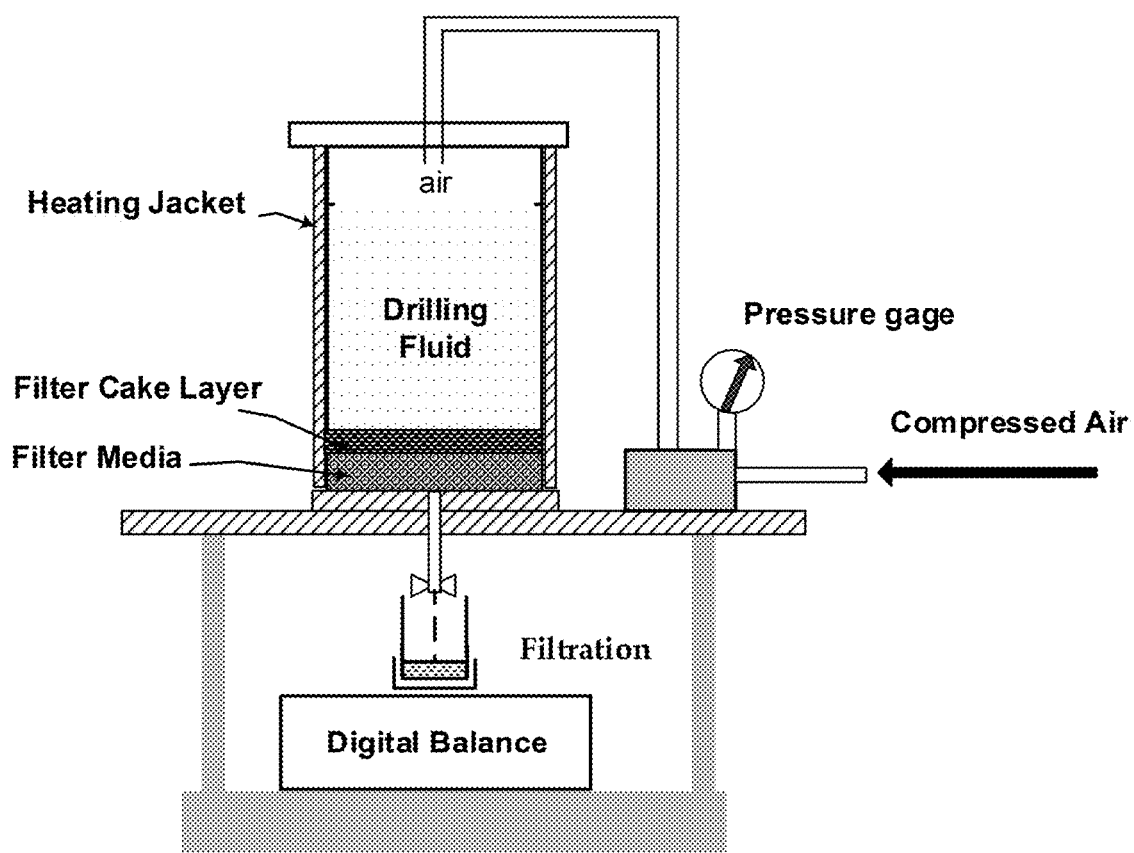
FIG. 8 is a diagram of the assembled HPHT filter press being used to form a filter cake from barite oil-based drilling fluid.

The fluid loss test was started by opening the bottom valve, and the fluid loss was determined by collecting the filtrated volume with time. A diagram of the HPHT cell in this configuration is shown in FIG. 8. The standard test time was 30 min, as per API recommendations. The filtrated volume after 30 min reached 9 mL and remained constant.

Figure 9:
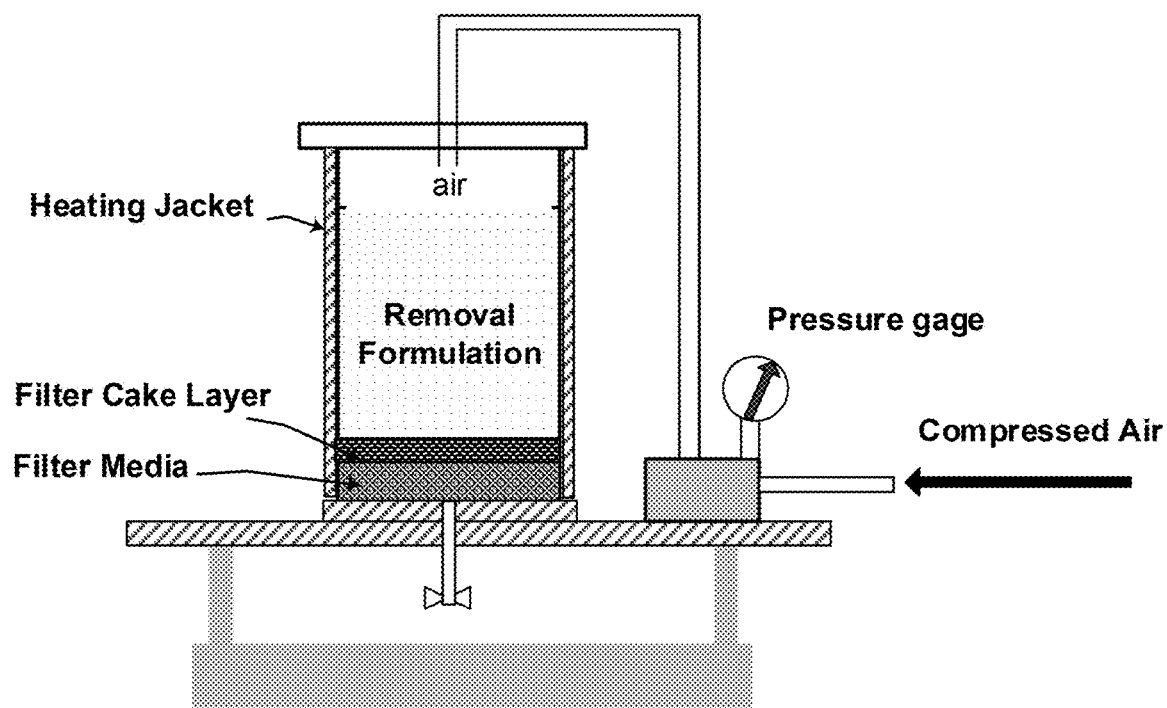
FIG. 9 is a diagram of the assembled HPHT filter press being used to remove a barite oil-based filter cake.
Figure 10A:
FIG. 10A is a filter cake sample before a single-step removal process.
Figure 10B:
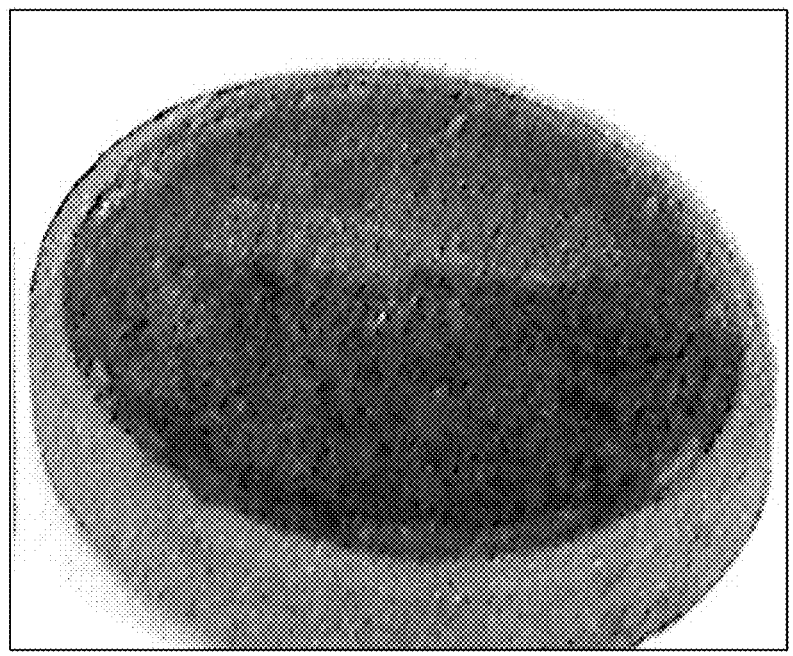
FIG. 10B is a filter cake sample after a single-step removal process.

After 30 min, the filter cake with the core was taken out and weighed. The filter cake was soaked with the removal fluid for a certain time at the designed pressure and temperature, using the HPHT cell as shown in the diagram in FIG. 9 At the end of the experiment, the remaining filter cake with the core was weighed and the removal efficiency was calculated. FIG. 10A shows an example filter cake before treatment with the removal composition, and FIG. 10B shows the filter cake after treatment.

To calculate the removal efficiency, the weight was measured for the saturated core before the filtration ($W_{core}$), the core with the filter cake after the filtration ($W_{core+cake}$), and the core with the remaining filter cake after the removal process ($W_{core+remaining\ cake}$). The removal efficiency was determined by:

$$\text{Efficiency} = \frac{W_{core+cake} - W_{core+remaining\ cake}}{W_{core+cake} - W_{core}}$$

At 300° F. the removal efficiencies were 87% and 89% for two different tests.

Example 4

Retained Permeability.

The time required to flow 150 cm$^3$ of DI water through the core at a constant pressure drop (60 psi) was recorded, and this information was used with Darcy's law to calculate the initial permeability, $k_i$, in units of mD. Then, a filter cake was formed on the core using the HPHT filter press as described previously. Next, chemical treatment with the removal composition was performed to remove the filter cake. Then the final permeability, $k_f$, was measured by the same procedure as described for the initial permeability. The retained permeability, $k_r$, is the relation between the initial and final permeability of the core:

$$k_r = \frac{k_f}{k_i} \times 100\%$$

The initial core permeability was 150 mD (Berea sandstone) and the final permeability value was 142 mD, for a 95% retained permeability, $k_r$. The acceptable limit from the literature is a retained permeability of at least 80%.

Example 5

Wettability Alteration Test.

The wettability was measured through surface tension measurements. The surfactant was used at a concentration of 0.25 wt % or less relative to a total weight of the solution. The interfacial tension with air was measured and was found to be reduced from 72 dynes/cm (pure water) to 22 dynes/cm. The preferred industry value is less than 30 dynes/cm.

Example 6

Corrosion Rate Test with the HPHT Autoclave

Figure 11A:
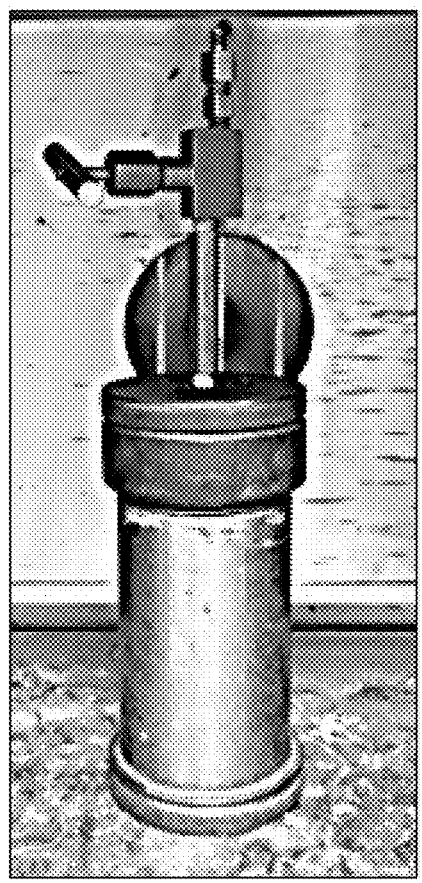
FIG. 11A is an assembled autoclave used to measure the corrosion activity of the filter cake removal composition.
Figure 11B:
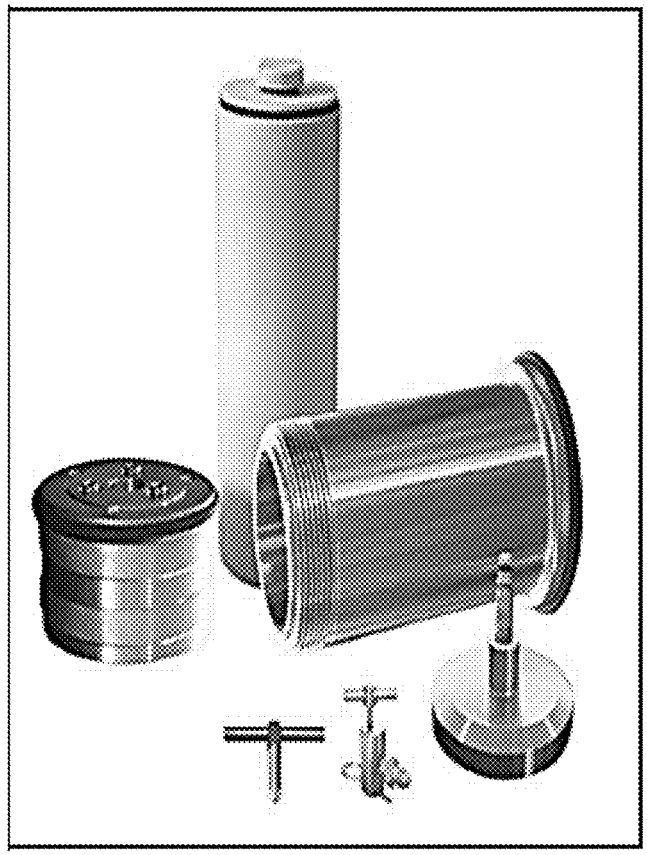
FIG. 11B is an example of an autoclave similar to FIG. 11A, in a disassembled state.
Figure 12A:
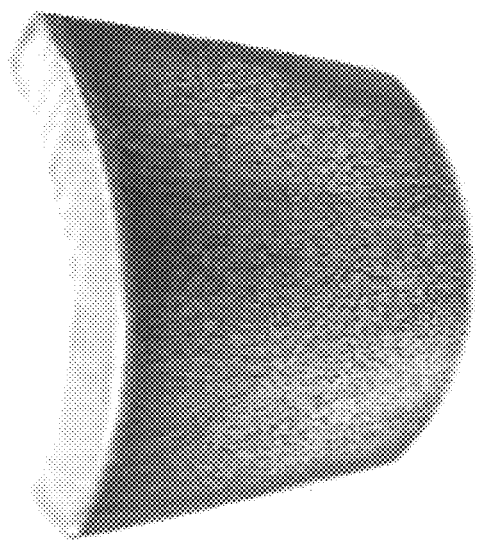
FIG. 12A is the casing coupon before the corrosion test.
Figure 12B:
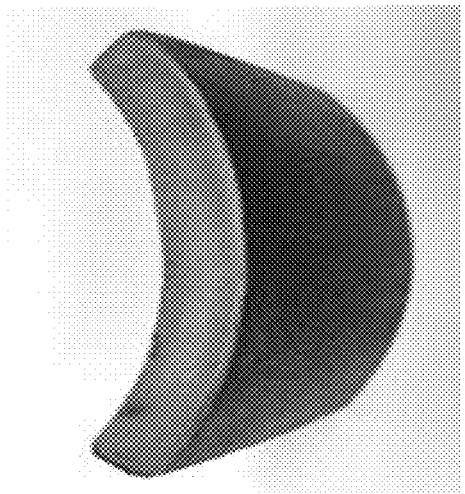
FIG. 12B is the casing coupon after the corrosion test.

Several corrosion tests were carried out using the composition that showed the highest solubility of barite. Steel casing coupons were used in the corrosion tests. The test was conducted for 6 hours using an autoclave cell, as shown in FIGS. 11A and 11B. Casing coupons were placed in the autoclave with the filter cake removal composition and subjected to 270° F. and a gas mixture at 1500 psi for 6 hours. The gas mixture comprised 10 vol % $H_2S$, 10 vol % $CO_2$, and 80 vol % $N_2$, each with respect to a total volume of the gas mixture. The casing coupons were weighed before and after the exposure in order to determine the corrosion rate. The corrosion rate was 0.01 lbm/ft² per 6 hours. The accepted industry standard is a corrosion rate of no greater than 0.05 lbm/ft² in the same time period. FIGS. 12A and 12B show a casing coupon before and after the corrosion test, respectively. The similarity of the casing coupon before and after the corrosion test indicates the low corrosion rate with the filter cake removal composition.

The invention claimed is:

1. A composition, consisting of:
    17-22 wt % of a chelating agent;
    3-7 wt % of potassium carbonate as a converting agent;
    3-12 wt % of a persulfate salt;
    3-15 wt % of a mutual solvent;
    0.5-5.00 wt % N-cis-13-docosenoic-N,N-bis(2-hydroxymethyl)-N-methyl ammonium chloride;
    0.05-2.00 wt % sodium dodecyl benzene sulphonate, and
    a base solvent of water, brine, seawater, or freshwater,
    wherein each weight percentage is with respect to a total weight of the composition,
    wherein the chelating agent is a salt of at least one selected from the group consisting of diethylenetriaminepentaacetic acid and ethylenediaminetetraacetic acid,
    wherein the persulfate salt is at least one selected from the group consisting of sodium persulfate, potassium persulfate, ammonium persulfate, and peroxydisulfate,
    wherein the mutual solvent is at least one selected from the group consisting of propylene glycol, ethylene glycol, diethylene glycol, glycerol, and 2-butoxyethanol, and
    wherein the composition has a pH of 11-13.

2. The composition of claim 1, wherein the chelating agent is potassium diethylenetriaminepentaacetate or potassium ethylenediaminetetraacetate.

3. The composition of claim 1, wherein the mutual solvent is propylene glycol, diethylene glycol, or glycerol.

4. The composition of claim 1, which has a corrosion rate of 0.00001-0.01 lb/ft² per 6 h in contact with a steel surface at 325-375° F.

5. The composition of claim 1, which has an interfacial surface tension of 15-30 dynes/cm with air.

6. The composition of claim 1, wherein the persulfate salt is sodium persulfate.

7. The composition of claim 6, wherein the base solvent is brine.

8. The composition of claim 7, wherein the chelating agent is potassium diethylenetriaminepentaacetate.

9. The composition of claim 8, wherein the mutual solvent is glycerol.

* * * * *